US012562149B2

(12) United States Patent
Wu et al.

(10) Patent No.: US 12,562,149 B2
(45) Date of Patent: Feb. 24, 2026

(54) EMOTION AND CHARACTER PARAMETERS FOR DIFFUSION MODEL CONTENT GENERATION SYSTEMS AND APPLICATIONS

(71) Applicant: Nvidia Corporation, Santa Clara, CA (US)

(72) Inventors: Xianchao Wu, Tokyo (JP); Hideaki Tagami, Yokohama (JP); Peiying Ruan, Kanazawa (JP)

(73) Assignee: Nvidia Corporation, Santa Clara, CA (US)

( * ) Notice: Subject to any disclaimer, the term of this patent is extended or adjusted under 35 U.S.C. 154(b) by 246 days.

(21) Appl. No.: 18/178,762

(22) Filed: Mar. 6, 2023

(65) Prior Publication Data

US 2024/0304177 A1     Sep. 12, 2024

(51) Int. Cl.
*G10L 13/10* (2013.01)
*G06F 40/247* (2020.01)
*G06T 17/20* (2006.01)

(52) U.S. Cl.
CPC ............ *G10L 13/10* (2013.01); *G06F 40/247* (2020.01); *G06T 17/20* (2013.01)

(58) Field of Classification Search
CPC ....... G10L 13/10; G06F 40/247; G06F 40/30; G06T 17/20; G06T 13/205
See application file for complete search history.

(56) References Cited

U.S. PATENT DOCUMENTS

| | | | | |
|---|---|---|---|---|
| 11,461,952 | B1 * | 10/2022 | Bosnak ................ | G06V 40/176 |
| 2016/0163332 | A1 * | 6/2016 | Un .................... | G06F 16/90332 |
| | | | | 704/260 |

| | | | | |
|---|---|---|---|---|
| 2020/0327327 | A1 * | 10/2020 | Wu ...................... | G06V 30/274 |
| 2023/0377238 | A1 * | 11/2023 | Hutton ................. | G06F 40/284 |
| 2024/0070951 | A1 * | 2/2024 | Tiwari .................. | G06N 20/00 |

OTHER PUBLICATIONS

Sonlu, Sinan, Uğur Güdükbay, and Funda Durupinar. "A conversational agent framework with multi-modal personality expression." ACM Transactions on Graphics (TOG) 40.1 (2021): 1-16. (Year: 2021).*

Osman, Mohamed. "EVASS: Emotional variational end-to-end speech synthesis with semi-supervised and adverserial learning." 2022 2nd International Mobile, Intelligent, and Ubiquitous Computing Conference (MIUCC). IEEE, 2022. (Year: 2022).*

* cited by examiner

*Primary Examiner* — Bhavesh M Mehta
*Assistant Examiner* — Jangwoen Lee
(74) *Attorney, Agent, or Firm* — Hogan Lovells US LLP

(57)     ABSTRACT

Approaches presented herein provide systems and methods for generating three-dimensional (3D) content with fine grained emotions and character traits. A set of classifiers may be used to identify emotions and character traits from an input provided by a user. Each of the classifiers in the set of classifiers may use a set of seed words that is expanded through methods including manual collection, synonym extension, and/or word alignment. An input may then be evaluated for indications of emotion and/or character traits, such as by identifying certain words or phrases present within the input. Output vectors associated with the identified emotion and/or character traits may then be provided to different generative models to adjust content, such as modifications to output audio or facial expressions for digital character representations.

19 Claims, 24 Drawing Sheets

200

202 — Hello, welcome to Weather Bot, for all your weather needs. How can I help you today?

204 — What's the weather like today?

206 — For which location?

208 — Paris.

210 — It is partly cloud in Paris, France with a current temperature of 17 degrees Celsius. There is a light wind of 3 kilometers per hour and an 80 percent chance of rain.

212 — Oh no. I wanted to for a run. When will the rain start?

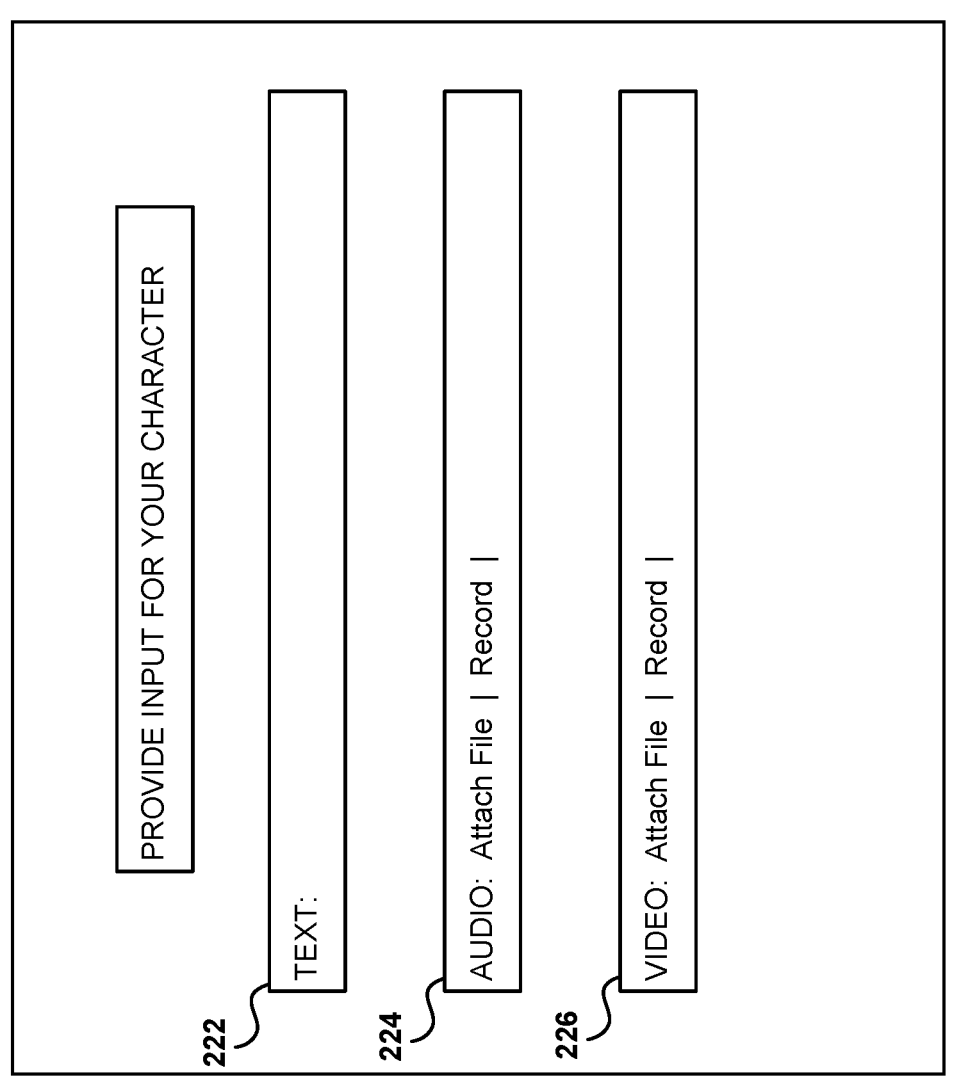
FIG. 2B

340

INPUT
306

EMO MOD
342

E.L.
356

CHAR MOD
344

C.L.
358

TEXT
ENCODER
346

E.P.
360

C.P.
362

PREDICTOR
350

REG.
352

STEP
ENCODER
348

S.E.
364

DECODER
354

NOISE
366

OUTPUT
368

420

422 ┐ Identify user log over time

424 ┐ Compare user log size and ratio of emotional words exceed threshold

426 ┐ Determine to proceed with personality test

428 ┐ Prepare list of questions and associated user answers with labeled personality conditions 430 ┐ Execute session-question matching model 432 ┐ Analyze user responses to questions 434 ┐ All questions answered?

No

Yes

436 ┐ Determine personality testing results

FIG. 4B

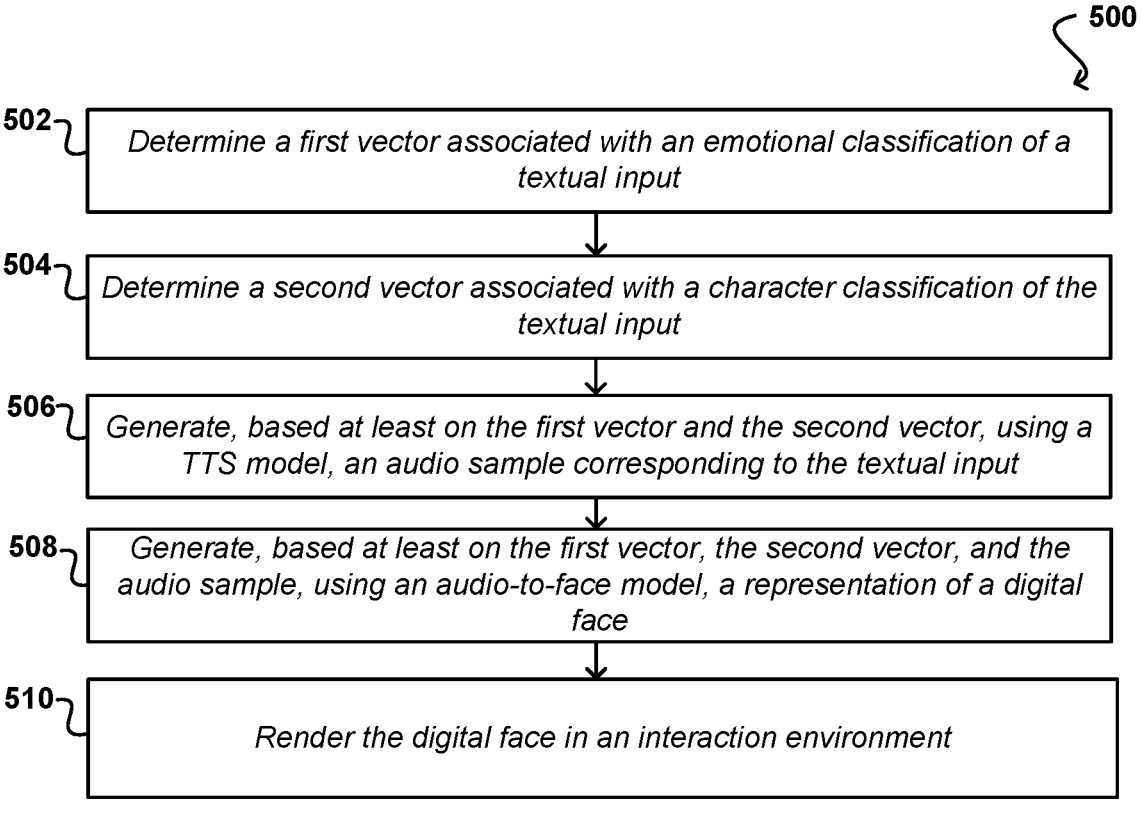

502 — Determine a first vector associated with an emotional classification of a textual input 504 — Determine a second vector associated with a character classification of the textual input 506 — Generate, based at least on the first vector and the second vector, using a TTS model, an audio sample corresponding to the textual input 508 — Generate, based at least on the first vector, the second vector, and the audio sample, using an audio-to-face model, a representation of a digital face 510 — Render the digital face in an interaction environment

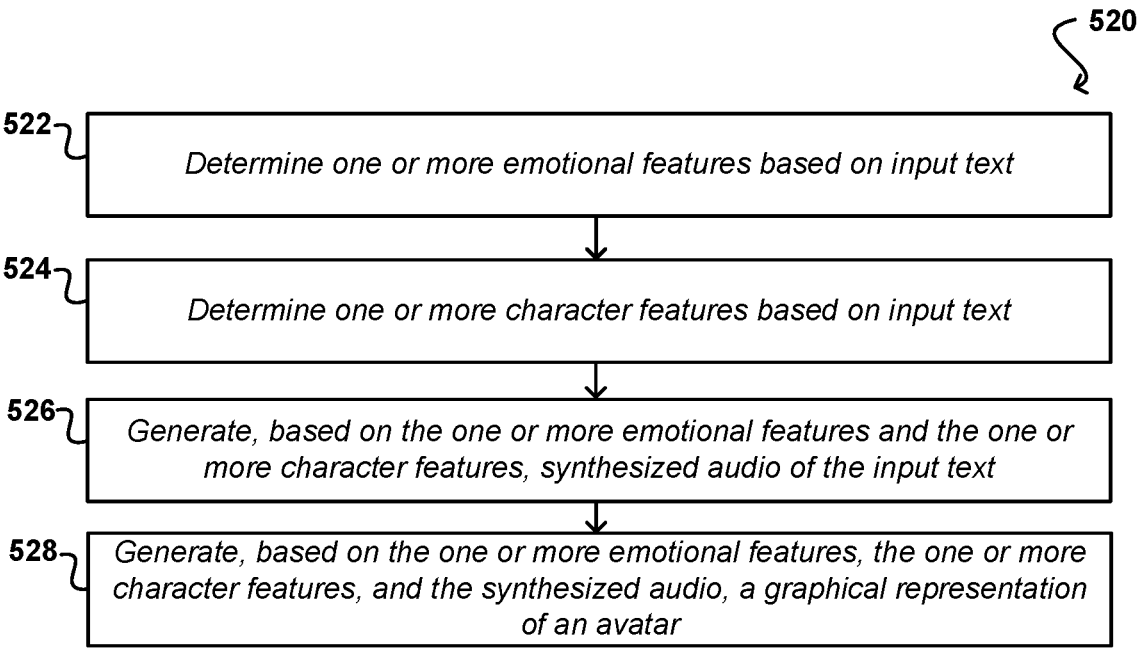

522 — Determine one or more emotional features based on input text

524 — Determine one or more character features based on input text

526 — Generate, based on the one or more emotional features and the one or more character features, synthesized audio of the input text 528 — Generate, based on the one or more emotional features, the one or more character features, and the synthesized audio, a graphical representation of an avatar

FIG. 5B

DATA CENTER
800

EMOTION AND CHARACTER PARAMETERS FOR DIFFUSION MODEL CONTENT GENERATION SYSTEMS AND APPLICATIONS

BACKGROUND

Content generation systems may be used to develop digital representations of users or other characters, which may be referred to as digital avatars. One or more machine learning techniques may be used to allow users to interact or otherwise change different parameters of the generated characters. For example, a text-to-speech (TTS) system may be used to receive a textual input from a user and convert that input into auditory speech. With digital characters, the generation systems may also adjust different features of the characters to simulate the character speaking or otherwise being the source of the auditory speech. A more fulfilling user experience is provided as realism for the characters increases, such as by incorporating emotions or different traits into the characters. For example, a user may prefer their own digital avatar to reflect their emotions, such as changes in facial features for happiness, sadness, anger, surprise, and others. However, it is difficult to accurately detect and reflect different emotions or traits without significant data collection, training, and tuning, thereby sometimes reducing the realism present with digital characters, such as those used in large interaction environments.

BRIEF DESCRIPTION OF THE DRAWINGS

Various embodiments in accordance with the present disclosure will be described with reference to the drawings, in which:

FIG. 2B illustrates an example interface for providing inputs to an interaction environment, in accordance with various embodiments;

FIG. 4B illustrates an example process for implementing a personality test, in accordance with various embodiments;

FIGS. 5A and 5B illustrate example processes for generating a digital avatar, in accordance with various embodiments;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments can be used to generate three-dimensional (3D) and/or two-dimensional (2D) content. In at least one embodiment, the 3D and/or 2D content may be provided within an integrated interaction environment and may correspond to a digital avatar representative of one or more users or other characters of the interaction environment. A machine learning system may combine one or more models in order to generate features of the avatar, process inputs, identify emotional characteristics, identify charter traits, and/or animate and/or render the content. For example, a set of classifiers may be used in order to determine fine-grain emotion and character information for a given user. Each of the classifiers for the emotion and character determinations may use a set of seed words that is expanded through manually collected information, synonym extension, and/or word alignment with different languages. Input text may then be evaluated against a seed word collection to classify different levels of emotion or character traits. Output vectors corresponding to emotion and character may then be provided to a text-to-speech (TTS) model that may use the vectors to label a sentence generally and also to individually label words or sub-words of the sentence to provide different emphasis on different words. The generated speech that is output, along with the vectors, may also be provided to an "Audio2Face" model to generate facial expressions based on the words being said and their associated emotions. Embodiments may also extend avatar generation to body positions. As a result, many different 3D avatars may be created based on user characteristics to provide more realistic avatars using less user-specific data.

Various other such functions can be used as well within the scope of the various embodiments as would be apparent to one of ordinary skill in the art in light of the teachings and suggestions contained herein.

Figure 1:
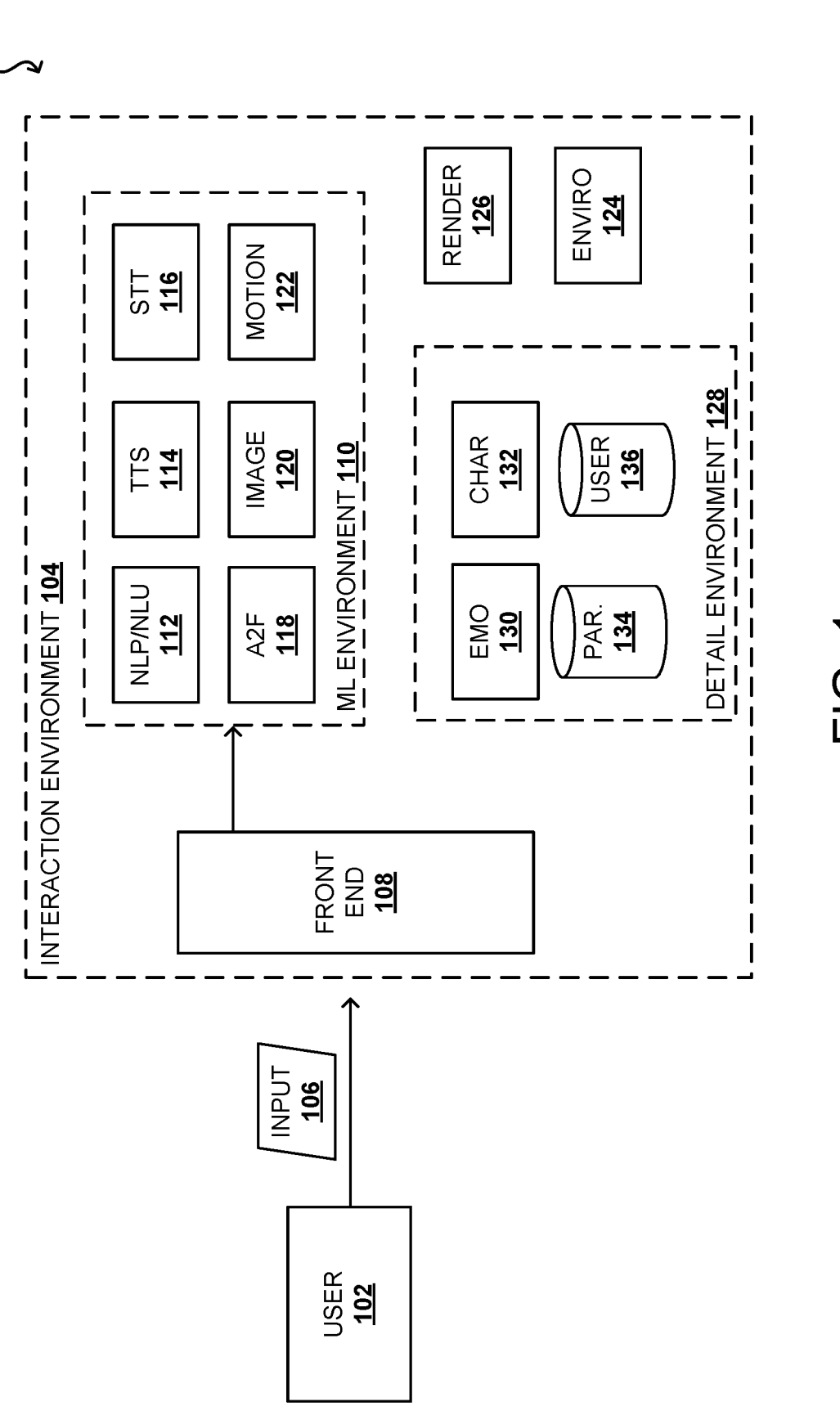
FIG. 1 illustrates an example interaction environment incorporating emotional evaluations, in accordance with various embodiments.

FIG. 1 illustrates an example environment 100 in which various aspects of the present disclosure can be performed. In this example, a user 102 may be associated with an interaction environment 104, such as a virtual interaction environment in which the user may send commands and/or receive content and information. For example, the user 102 may be a registered user that communicates with the interaction environment 104 over one or more networks, such as the Internet, for content generation and/or consumption, such as systems associated with virtual reality (VR), augmented reality (AR), mixed reality (MR), streaming, and/or the like. In at least one embodiment, content within the interaction environment 104 may be generated in accordance with instructions from one or more applications executing within the interaction environment 104.

The user 102 may provide an input 106 to the interaction environment 104 that is received at a front end 108, which may be a landing page or application programming interface (API) associated with the interaction environment 104. The API may provide the user 102 with options to interact with different content, change settings, and/or the like. For example, the front end 108 may include a chat bot feature in which the user 102 may ask questions (e.g., the input 106 may be a textual input, a video input, an image input, an auditory input, a motion input, and/or combinations thereof), and the front end 108 may route the input 106 to one or more workers that may analyze the input, determine an appropriate response, and then provide information for processing and rendering or otherwise generating a response. In at least one embodiment, the user 102 may provide the input 106 by direct connection to the front end 108 and/or through one or more partner applications developed by the developer of the interaction environment 104 and/or other third-party applications.

As noted, a worker may be associated with the front end 108 in order to take the input 106 and direct the input 106 to one or more elements of a machine learning (ML) environment 110. For example, the worker may include a queue that receives inputs and routes them to an appropriate end location, for example, based on one or more tags or other features of the input. The queue may be sequential (e.g., first in, first out), but various embodiments may allow different inputs to be prioritized. For example, different types of input may receive higher priority than others and/or the input 106 may include information to identify a priority of the input 106.

In at least one embodiment, the worker may identify different portions of the input 106 in order to route the information to the appropriate system within the ML environment 110. For example, a purely textual input may be routed to a worker that is associated with textual inputs, such as a TTS module and or a text understanding API. As another example, an input that includes a video may be routed to multiple workers, such as one for image recognition and one for audio recognition. The routing may be based on tags or other markers associated with the input 106, which may also be stored as metadata for the input 106. For example, a textual input may be provided in the form of a file type (e.g., a .txt file extension) and/or may be a recognized and accepted input for a certain interface element. In contrast, a video file (e.g., a .mp4 or .mov file extension) may be routed and labeled differently due to the potential inclusion of both audio and images. Furthermore, multiple modalities may be used depending on the content of the input 106. Returning to the example of a video file, the content may include images as different frames of the video files. Furthermore, there may be audio associated with the video. Additionally, individual frames may include text, such as textual overlays associated with closed captioning. Accordingly, the front end 108 and/or one or more associated workers may be used to identify appropriate routing and processing for individual inputs. Various embodiments may also further delineate the workers associated with the ML environment 110 based on different end use applications. For example, one or more front end components may be associated with a particular function, such as a weather widget or an alarm clock, and as a result, different expected inputs may be known and used for routing. In a weather widget, for example, a location service may be used because it may be anticipated that a user will ask for weather conditions in a particular location.

In at least one embodiment, the ML environment 110 includes different worker applications or modules, which may be container hosted applications associated with the interaction environment 104. The different applications may be called to perform one or more functions based in part on the input provided to the ML environment 110. The ML environment 110 may be separate from and/or in communication with the interaction environment. For example, the ML environment 110 may include one or more service applications provided by a third party integrated into the interaction environment 104.

This example includes a natural language processing (NLP)/natural language understanding (NLU) unit 112. The NLP/NLU unit 112 may be used with one or more conversational artificial intelligence (AI) systems to enable humans to interact naturally with devices. The NLP/NLU unit 112 may be used to receive, process, and evaluate different portions of the input 106. For example, the input 106 may be preprocessed, which may include tokenization, lemmatization, stemming, and other processes. Additionally, the NLP/NLU unit 112 may include one or more deep learning models, such as a BERT model, to enable features such as entity recognition, intent recognition, sentiment analysis, and others. Furthermore, the NLP/NLU unit 112 may enable conversion of linguistic units of the input 106 into phonemes, which may then be assembled together, such as by using one or more prosody models.

Further included within the ML environment are a TTS unit 114, a speech-to-text (STT) unit 116, an audio-to-face (A2F) unit 118, an image recognition unit 120, and a motion detection unit 122. Each of these various elements may be associated with one or more different machine learning systems, such as those launched from different containerized applications, that use trained models that may be particularized for different applications based on various parameters (e.g., weights) added to the models.

For example, one TTS unit 114 may be used for English-language speech while another may be used for Japanese-language speech by incorporating different weighting parameters within the trained model. Additionally, various embodiments may combine associated features with these different units, such as applications to label data, generate output content (e.g., generative networks), and/or the like. In at least one embodiment, TTS unit 114 may take a text input processed by the NLP/NLU unit 112 and change it to natural-sounding speech. The output from the NLP/NLU unit 112 may undergo various processes associated with the TTS unit 114, such as linguistic analysis, synthesis, and the like. Additionally, parts of speech may be tagged. In various embodiments, output may be further analyzed for refining pronunciations, calculating the duration of words, deciphering the prosodic structure of utterance, and understanding grammatical information. Additionally, text may be converted to mel-spectrograms for output to a vocoder to generate natural sounding speech.

As an example, the STT unit 116 may take a verbal input, such as an utterance, and then resample the raw audio signals using one or more signal processing techniques, such as standardization, windowing, and/or conversion, among other options. This processing may enable spectrogram transformation to provide a machine-understandable version of the utterance. One or more acoustic models may be associated with the STT unit 116 to consider a spectrogram as an input and produce probability scores for all different vocabulary tokens over different time steps. In various embodiments, one or more language models may then be used to add contextual representation so that a decoder may output the speech in a textual format.

Systems may also incorporate the A2F unit 118 to retarget a stylized face such that movement of the face's mouth will mimic an associated audio input. For example, different portions of the face, such as the eyes, mouth, tongue, head movement, and the like may be manipulated responsive to the words being spoken by the avatar. In at least one embodiment, the A2F unit 118 may be used at runtime or within one or more content creation pipelines. In at least one embodiment, the A2F unit 118 may incorporate or use one or more 3D character models (e.g., a mesh) to be animated with the input audio track, which may be generated from a textual input using the TTS unit 114. The audio input is fed into a pre-trained Deep Neural Network. In addition, the output drives the 3D vertices of the character mesh to create facial animations in real or near-real time (e.g., without significant delay). Such a system may incorporate the Omniverse Audio2Face product from NVIDIA Corporation.

Additionally, as noted herein, various embodiments may incorporate the image recognition unit 120 to identify objects within an image, such as within frames of a video sequence, and/or to track movement of an object using one or more motion detection units 122. For example, a body-pose model may be used for motion recognition and/or for motion avatar generation. A list of body points may be provided and/or mesh curves may be used to express the modeling for a whole-body, such as with a 3D avatar animation. As will be described herein, similar generation techniques may be applied to body part generation as with face generation by replacing the frames associated with the face with the body parts. In this manner, a variety of inputs 106 provided to the interaction environment 104 may be modified to generate one or more appropriate outputs. These outputs may include both emotion and character-enriched voices and body-language, even with surfaces (e.g., clothes, caps, etc.) to better express the avatar of each individual in the interaction environment.

By way of example, a text chat worker may be used in combination with the NLP/NLU unit 112 to analyze an input and then provide the input to one or more additional systems, such as the TTS unit 114 and the A2F unit 118 to generate a virtual avatar that may appear to be a human face saying the words associated with the textual input. For example, as noted, the TTS unit 114 may be used to receive an input, such as text, and then generate an auditory output. This auditory output maybe paired with the A2F unit 118.

In at least one embodiment, the text chat worker can be split into a number of detailed service support workers, such as a time service (for requests such as "please call me at six o'clock for the meeting"), a weather service (for requests such as "Will it be raining tomorrow?" or "Do I need to bring my umbrella tomorrow flying to Beijing?"), and so on. As noted herein, different systems may be used in combination with others. For example, the weather service example may use the NLP/NLU unit 112 to process the speech and identify different portions of the speech and then process that information with one or more additional units in order to identify weather in Beijing for the specified date. That is, the input may be parsed into different components (e.g., weather inquiry, date for inquiry, and location) and then different (e.g., containerized) applications and/or models may process the various components to generate an output for the user.

In an embodiment, sounds (e.g., auditory inputs) are recognized and decoded as texts. For example, within the NLP/NLU unit 112 and/or as a separate module associated with the TTS unit 114 and/or the STT unit 116, a speech recognition API may be incorporated. Furthermore, after the text sentences are decoded from sounds, the worker associated with the sounds (e.g., the application within the NLP/NLU unit 112) may then provide the information to another application for language understanding, request analysis, response generation, and/or the like. In various embodiments, different applications and models may be used for these various tasks, which may be part of the ML environment 110 and/or accessible to the ML environment 110, for example using one or more networks.

As noted, the input 106 may be provided in a variety of different forms, such as text, sounds, video, images, and/or combinations thereof. When the input 106 includes images, such as an input image or a set of images, such as a video sequence, the image recognition unit 120 may be used to evaluate and identify one or more objects within the input image. The images and/or objects within the images may then be decoded into text, such as via one or more labeling capabilities of the image recognition unit 120. For example, if the input 106 included an image of a dog, the interaction environment 104 could be used to evaluate the image to identify one or more features, such as the color of the dog, breed of the dog, and/or the like. Furthermore, when paired with additional information or when supplied as an input into another application of the ML environment 110, such as the TTS unit 114, the input of a dog breed, such as a "German Shepherd" would be used to generate a response for the user 102, such as "Your German Shepherd is very cute! What is its name?" In at least one embodiment, the image-to-text model is pretrained and accessible via the ML environment 110.

Various embodiments may provide a framework associated with the interaction environment 104 to enable different workers, applications, and/or pre-trained models to be plugged into and used within the system as needed. As a result, the interaction environment 104 may be adaptable to different user specifications and needs. For example, a location-based worker may be incorporated to support location-based services, such as a restaurant providing an online ordering system or a user requesting information as they are traveling. In at least one embodiment, different features of the input may be used to pull or otherwise identify the appropriate worker based, at least in part, on the context of the input. If a user were to provide an input asking a question that included location information, the ML environment 110 may identify one or more different models for incorporation and use to address the input. For example, if a user were to ask the interaction environment to "Order a pizza from Pizza Shoppe to be delivered to my office" the ML environment 110 may be used to identify the purpose (e.g., online order), the vendor (e.g., Pizza Shoppe), the form of the order (e.g., delivery), and the delivery location (e.g., the user's office). Such a system may incorporate a variety of different workers or models, such as a first model to identify intent from the input, a second model to identify location services associated with the desired menu, and a third model to identify the user's desired delivery location.

In at least one embodiment, an environment worker 124 and a rendering unit 126 may be used to generate one or more outputs based, at least, on the input 106. For example, the environment worker 124 may include a queue that receives responses from the ML environment 110 and then transfers the responses into a cache. The cache may be used maintain a sequence of responses based on a time when the user provides one or more inputs 106. Furthermore, it may be desirable to provide responses in a pre-defined time stream. For example, a single input 106 may be associated with a request that has more than one response, and as a result, it may be desirable to provide the information in a certain order or with a certain time delay between the responses. Moreover, the responses may be provided through one or more partners associated with the interaction environment 104. The rendering unit 126 may be used to generate an output associated with one or more images, such as a virtual face associated with a 3D avatar, among other options. The rendering unit 126 may be part of, or associated with, one or more content generation pipelines that may be used to create or update different characters or content for presentation within the interaction environment.

Various embodiments of the present disclosure may provide improved fine-grain details by incorporating a detail environment 128 that may be used to identify information associated with a user and/or a particular avatar or character associated with the user, such as character trait and/or emotion. For example, different inputs may be associated with different emotional states and/or be presented differently based on a user's character traits. These differences in emotion and character traits need to be incorporated into the avatars or characters in order to provide more realistic environments, characters, and worlds within the interaction environment. For example, a confident, boisterous character may speak loudly and have more animated facial features than a shy, timid character. However, existing models have difficulty identifying these characteristics from inputs alone. Instead, these models rely on pre-trained or defined meshes or parameters for each individual character, which are costly and time-consuming to produce. Systems and methods of the present disclosure provide for one or more models to identify and generate quantified values and parameters for emotion and character traits that can be incorporated as inputs into one or more additional services, such as the TTS unit 114 and/or the A2F unit 118, in order to generate more realistic, lifelike characters and avatars that display a broader range of emotion.

In this example, the detail environment 128 includes different models, such as pre-trained machine learning models as will be described below, to identify emotions and character traits for a user based on factors such as the input. In this example, an emotion unit 130 and a character unit 132 may include one or more trained machine learning systems that receive an input, such as a textual input, and identify one or more factors to determine an emotion or character trait associated with the input. By way of example, an input such as "I've been tired lately" may be associated with an emotion of distraction or boredom (depending on the context) and may also be paired with one or more character traits, such as openness, conscientiousness, extraversion, agreeableness, or neuroticism. These factors, in combination, may then be used to determine different features of a response, such as pitch for certain words, facial expressions, and/or the like. In various embodiments, a parameter database 134 may be used to store information or parameters for different models. For example, the parameter database 134 may include data obtained from training models using different inputs, seed words, implicit testing, and/or the like, as will be described herein. Furthermore, a user database 136 may store information for different users and/or characters. Accordingly, a specific character for a certain avatar, such as a particular avatar used in a game, may be preloaded and modified based on the character's perceived traits, and not necessarily the traits of the user controlling the character. In this manner, the detail environment 128 may be used to provide a richer level of emotion and detail to different avatars and/or characters generated or otherwise associated with the interaction environment 104.

Embodiments of the present disclosure may incorporate a variety of different models, which may be associated with one or more trained machine learning systems, to be used within a rendering pipeline and/or interaction environment to accurately represent emotions and character traits for different users and/or characters. Systems and methods may incorporate a fine grain emotion model, a human characteristic classifier (which may also be applied to non-human characters, such as those used as characters in movies or video games, among other options), a TTS system that uses emotions and characteristic classifications to generate audio outputs, and one or more generation models, such as A2F and/or a full body mesh generation model in order to represent a character illustrative of the determined emotions and/or characteristics. These systems may provide richer emotional context than traditional systems, such as those relying on sentiment analysis, because a sentiment itself may be insufficient to identify emotions behind the sentiment at a deep enough level to accurately adjust and/or reflect the emotion for a rendered character. Furthermore, sentiment analysis is often limited to surface-level emotions (e.g., like or dislike) and not the deep emotions often needed to accurately reflect certain situations in interaction environments or rendering pipelines, such as for video games or movies, among other options. Accordingly, various embodiments may deploy models to quantify different emotions and character traits for a user or character and then use such features when generating and rendering outputs associated with the user or character.

Figure 2A:
FIG. 2A illustrates an example interface between a user and a chat bot, in accordance with various embodiments.

FIG. 2A illustrates an example interface 200 for a chat bot program that may be used to gather information from a user, such as the input 106 that may then be provided to one or more trained models to identify emotions or character information associated with the user. In this example, a user may interact with a chat bot program associated with the weather. The chat bot may be programmed to provide a greeting 202 when the user begins the interaction and then wait a predetermined amount of time to receive a query 204, which may typically be a question (e.g., "What's the weather like today?") or a request ("Tell me about the chances of rain this week."). In this example, the user's query 204 does not have sufficient information for a reply, and therefore, a follow up request 206 is generated by the chat bot to obtain additional information, followed by a supplemental response 208. The chat bot may then provide an answer 210, which may include different information that is either tuned based on parameters or user preferences. For example, the answer 210 provides metric units because the location request is a European country. However, in other embodiments, standard units may be used based on information known about the user and/or based on user preferences. Additionally, the type of information provided may change based on user preferences and/or the like. Here, the answer 210 includes temperature, wind speed, and chance of rain. However, other embodiments may include more or less information, such as humidity, wind chill, and/or the like. The user, in this example, provides a reaction 212. The reaction 212 may provide rich emotional detail that is often not captured by various models. For example, the use of "oh no" expresses disappointment with the weather. Additionally, the user provides information related to a hobby or interest, which may be useful in identifying character traits. If the user provides the sufficient opt-in permission, this information may be collected or used with various systems and methods to train or otherwise establish parameters associated with emotion and character traits.

FIG. 2B illustrates an environment 220 in which a user may provide one or more inputs to be used within a content generation pipeline, such as to generate dialog for a virtual or digital avatar (such as for NVIDIA's Omniverse Avatar Cloud Engine (ACE)). In this example, the user has a variety of options for providing the input, including a textual input 222, an auditory input 224, a visual input 226, and/or combinations thereof. In at least one embodiment, the environment 220 may be associated with a content generation pipeline in which a virtual avatar of the user will be rendered as if the avatar is repeating the input. For example, if the avatar includes a face, the face will be manipulated such that the lips, mouth, and/or other features of the avatar move in response to the input. However, as noted herein, realism is provided by the emotion shown on the face of the avatar in combination with the speech. For example, the user may provide a text input such as "I need to leave." This phrase may be involved with different emotions depending on the context. For example, the user may be sad that they need to leave. The user may be insistent and almost angry by demanding that they are going. Additionally, the user may casually note the phrase with limited or no emotion. Furthermore, depending on the emotion, different words may have different emphasis. For example, if the user were angry, greater emphasis may be on "I" or "leave." If the user were sad, then the tone may be softer. Systems and methods may be used to identify these deep emotional characteristics from the input based, at least, on one or more trained emotion or character models. Accordingly, generative environments for different content generation pipelines may receive deeper, richer information that may be used with creating characters and/or the like.

Figure 2C:
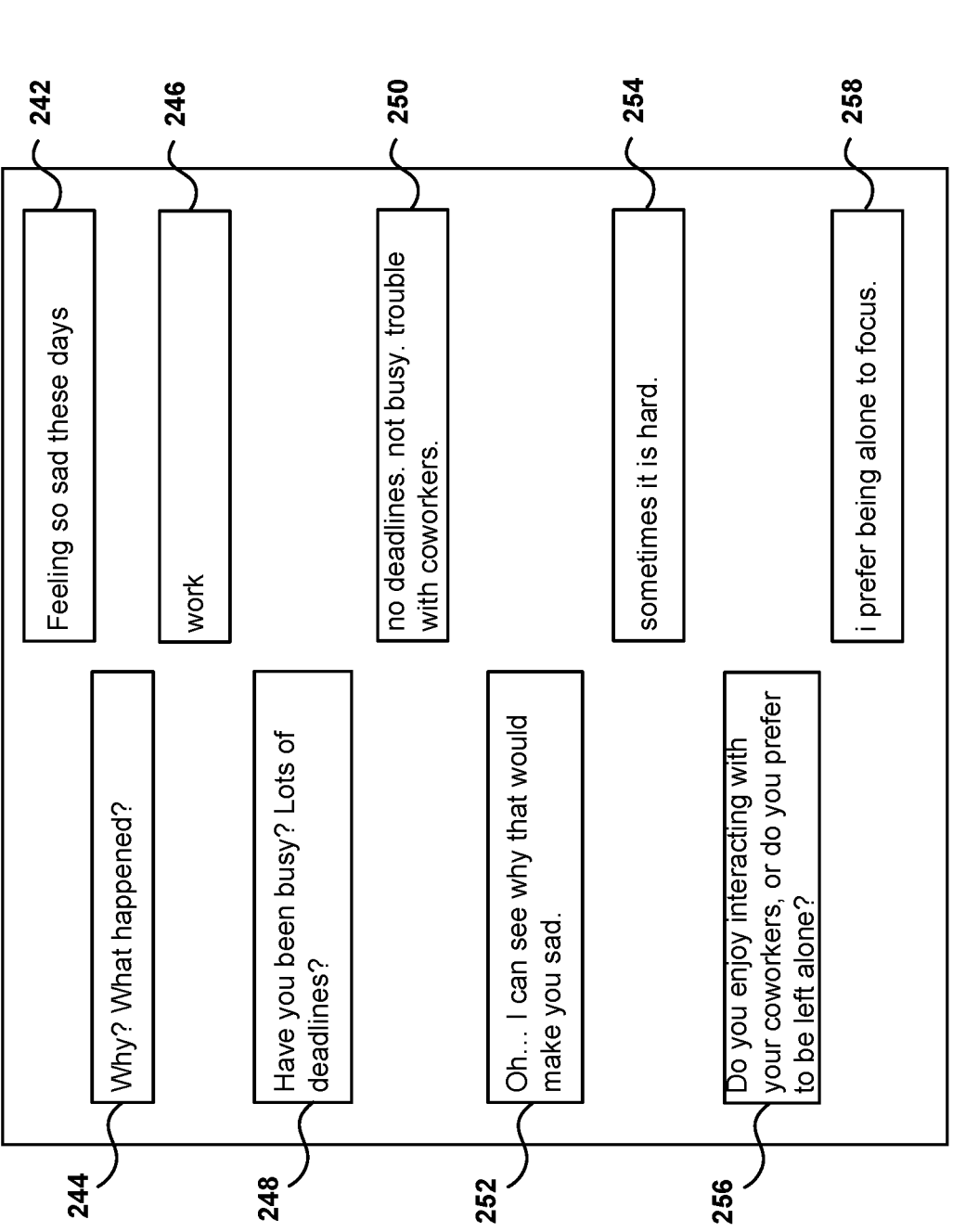
FIG. 2C illustrates an example interface between a user and a chat bot, in accordance with various embodiments.

FIG. 2C illustrates an environment 240 in which the user may interact with the chat bot in order to perform one or more implicit personality tests. Implicit personality testing may be deployed, upon opt-in from the user, to gather information for the user related to emotions and/or character traits. This information may then be used to adjust different portions of their digital avatars and/or characters associated with the user in situations where the user wants the character to mimic themselves in the digital world. In at least one embodiment, the testing may be deployed upon some trigger or indicator that a particular conversation or sequence may be useful for gathering information. As described herein, this information may then be used to train one or more models that are used to analyze input text, images, audio, and/or the like to provide quantified character and emotion scores for use with one or more aspects of a rendering pipeline or interaction environment.

In this example, the user begins a chat with the bot expressing frustration and emotion regarding their current state. For example, an initial message 242 may be provided within the chat and may include one or more words or phrases that identify a scenario in which personality testing may be performed. In FIG. 2C, the words "feeling" and "sad" may trigger such a response. Additionally, the form in which information is provided may also serve as a trigger. For example, the user may began using proper sentence structure (e.g., capital letters, punctuation, etc.) and then stop or start using emojis or abbreviations. Each of these may be associated with an indication that the user is expressing some emotion, which may then be used to begin the testing. The user may be provided with a message regarding the testing and may actively opt-in to the service. However, in other embodiments, the user may opt-out and the service may still provide a chat with the user while not recording or using the information for training purposes. A series of messages 244-254 are exchanged in which the chat bot attempts to receive information about the cause of the user's current emotional state. For example, the chat bot asks questions (244 and 248) and also provides support (252) based on the responses (246, 250) received from the user. In at least one embodiment, a testing question 256 may form part of the messages in which a question is posed to the user that may be used to identify a character trait. The illustrated question 256 may be used to probe whether the user considers themselves an introvert or an extrovert by asking about their preferred interactions with people. The user may then provide an answer 258, which may be used for training or otherwise generating content associated with the user.

Various embodiments of the present disclosure may use one or more models to identify different classes of emotions for analyzing inputs, such as textual, voice, and/or image/video inputs. For example, existing systems and methods may look at surface-level or shallow emotions, such as happy/sad, in order to identify characteristics for characters. However, these features are insufficient to provide the fine-grained, detailed expressions necessary for rich content applications, such as video games, interactive environments, animation, and/or the like. Systems and methods may deploy different emotional evaluations based on psychological information for emotions, such as Plutchik's wheel of emotions (e.g., Plutchik's wheel, the wheel, wheel of emotions, etc.), among other options. Plutchik's wheel of emotions categorizes multiple contrasting emotions and their various levels. For example, Plutchik defined eight basic emotions: anger, fear, sadness, disgust, surprise, anticipation, trust, and joy. However, Plutchik also recognized that there are levels to these emotions, where the levels may be based on intensity and/or strength. As a result, different emotions may be viewed as a variant of one or more of the basic emotions. For example, "disgust" can intensify to be "loathing" or "fear" may be reduced to "apprehension." Accordingly, the wheel of emotions may include base emotions as a basic indicator with emotions closer to the center being more intense and emotions farther from a center being less intense. Furthermore, Plutchik's wheel also identifies different compositions of emotions, known as a "primary dyad." For example, combinations of "joy" and "trust" may be associated with "love" while combinations of "disgust" and "anger' may be associated with "contempt."

As described, each of the basic emotions may be broken up into different levels. As a result, and for a non-limiting example, from the initial eight basic emotions, there may be a total of 24 different fine-grained categories. Returning to "disgust," a weaker version of "disgust" may be "boredom" while a stronger version of "disgust" may be "loathing." Combining these 24 fine-grained categories with the dyads, a total of 32 different emotion categories may be identified using Plutchik's wheel. These categories may be used with non-limiting embodiments of the present disclosure as final target category sets for a fine-grained emotion classification model. Furthermore, various other embodiments may incorporate one or more additional psychological models to provide further refinement or alternative evaluation.

Systems and methods may further incorporate one or more deep learning methods to determine one or more character traits, which may be referred to as, without limitation, the "big five" or as the "OCEAN" parameters. These trains may be associated with openness to experience, conscientiousness, extraversion, agreeableness, and neuroticism. The big-five personality traits, also known as the five-factor model (FFM), is a model based on common language descriptors of personality. When factor analysis is applied to personality survey data, some words used to describe aspects of personality are often applied to the same person. For example, someone described as "conscientious" is more likely to be described as "always prepared" than "messy." This widely examined theory suggests five broad dimensions used by some psychologists to describe the human personality and psyche. Openness to experience may be rated based on questions or prompts. For example, a prompt asking a person whether they want to travel to a new location would be indicative of a person having a trait more open to experience if they responded that they would like to learn more, as opposed to a person saying they were not interested or that they are content with their current usual travel locations. Similarly, conscientiousness may be determined by a person's response to solving a problem (e.g., willingness to work until complete) as opposed to a person refusing to help or be involved. Extraversion may be related to a person's desire to be within a large group or host an event, while introversion would be related to a person wanting to recharge quietly after an outing or a person that prefer solitary projects as opposed to group work. Agreeableness may be associated with a person indicating they would be willing to help another perform a task and negative examples of agreeableness would be a person harshly rebutting a request for help. Neuroticism may be associated with self-reported feelings of sadness based on past actions or a desire to control one's emotions better.

These OCEAN features may be identified, in part, using the implicit personality testing of FIG. 2C, among other options. It is time-consuming and expensive to manually perform a personality questionnaire for thousands of people and then collect the training data for training a deep learning model for scoring the big-five factors for one specific sentence or for one specific user. Accordingly, systems and methods may use an implicit testing pipeline, in which all these personality tests are performed in an implicit way. For example, questions are implicitly appended to a conversation session (such as the message 256 in FIG. 2C), and the answers from the users are collected using a sentiment analysis model. Pipelines for obtaining this information may make use of the "dense space similarity matching" model for selecting (manually) prepared questions for a current conversation session and a sentiment analysis model that judge the detailed tendencies of users' answers.

In at least one embodiment, the pipeline associated with data collection may take the form of a chat bot, such as the bot in FIG. 2C. User detection may occur where one or more factors are used to determine whether a particular user is selected to take the test. For example, various embodiments may deploy one or more evaluation matrices to judge a user's emotional curves during a period of time (e.g., a week, a month, a quarter, etc.). This information may be obtained based on how often a user interacts with the environment and the types of interactions that take place. If the user is only interacting to obtain information or make comments, there may not be sufficient rich emotional depth to their language to obtain character trait information. However, if the user is using emotional words or phrases, it may be easier to provide additional prompts to obtain information regarding their character traits.

As shown with the message 256, phrasing of questions may be used to identify various character traits for different users. In at least one embodiment, it may be desirable to keep these questions short, such as to one sentence, to increase a likelihood that the user will answer and also to reduce a quantity of information received responsive to the questions. Furthermore, reducing duplicate or similar questions between users may be desirable to provide novelty. Accordingly, systems and methods may deploy various transforms in order to adjust questions into a number of difference vectors. For example, word to vector (word2vec) lexicon may be deployed to rewrite words or phrase into synonyms to avoid repeating the same questions over and over to many people, or to the same user. Additionally, rephrasing questions may also reduce a likelihood a user recognizes the prompt and then provides false answers. Information may be gathered over a pre-set period of time because more than one answer may be necessary to identify character traits for a person. For example, people are rarely "all" of one trait, such as a person may be extroverted in certain circumstances, but introverted in another. Accordingly, it may be desirable to aggregate data over larger periods of time. Additionally, as will be described, character traits for people may be weighted based on where they fall on a spectrum between two ends of particular trait. Furthermore, collectioning more information may provide a deeper database for training. In at least one embodiment, a threshold number of questions provided to the user may be tracked, evaluated for answers, and then cycled through until the user answers a certain number of a time period has elapsed.

Embodiments may be used to develop a model where a final target is a judgment or classification to one of the big-five personality types associated with a given input for a user. Information may be gathered and then, in certain embodiments, questions may be adjusted and rolled out to additional users for further information gathering and/or more fine-tuned evaluations. Information may be collected as a tuple that includes a predicate, emotion category, and personality. For example, regarding the example in FIG. 2C, the tuple may be <interacting with coworkers, not enjoy, negative of "extraversion">. Furthermore, this "topic-emotion-personality" knowledge can be extended by considering different aspects or features of the tuple, such as <alone, dislike, positive of "extraversion">. As a result, different seeds may be constructed based on the prepared personality questions, implicit personality testing, and emotion analysis models. Due to the five different categories within the model, each can be labeled as either "positive" or "negative" to provide 10 categories within a final classifier. Then, a multiple-class classifier can be trained to solve the classification problem presented by character traits.

Figure 3A:
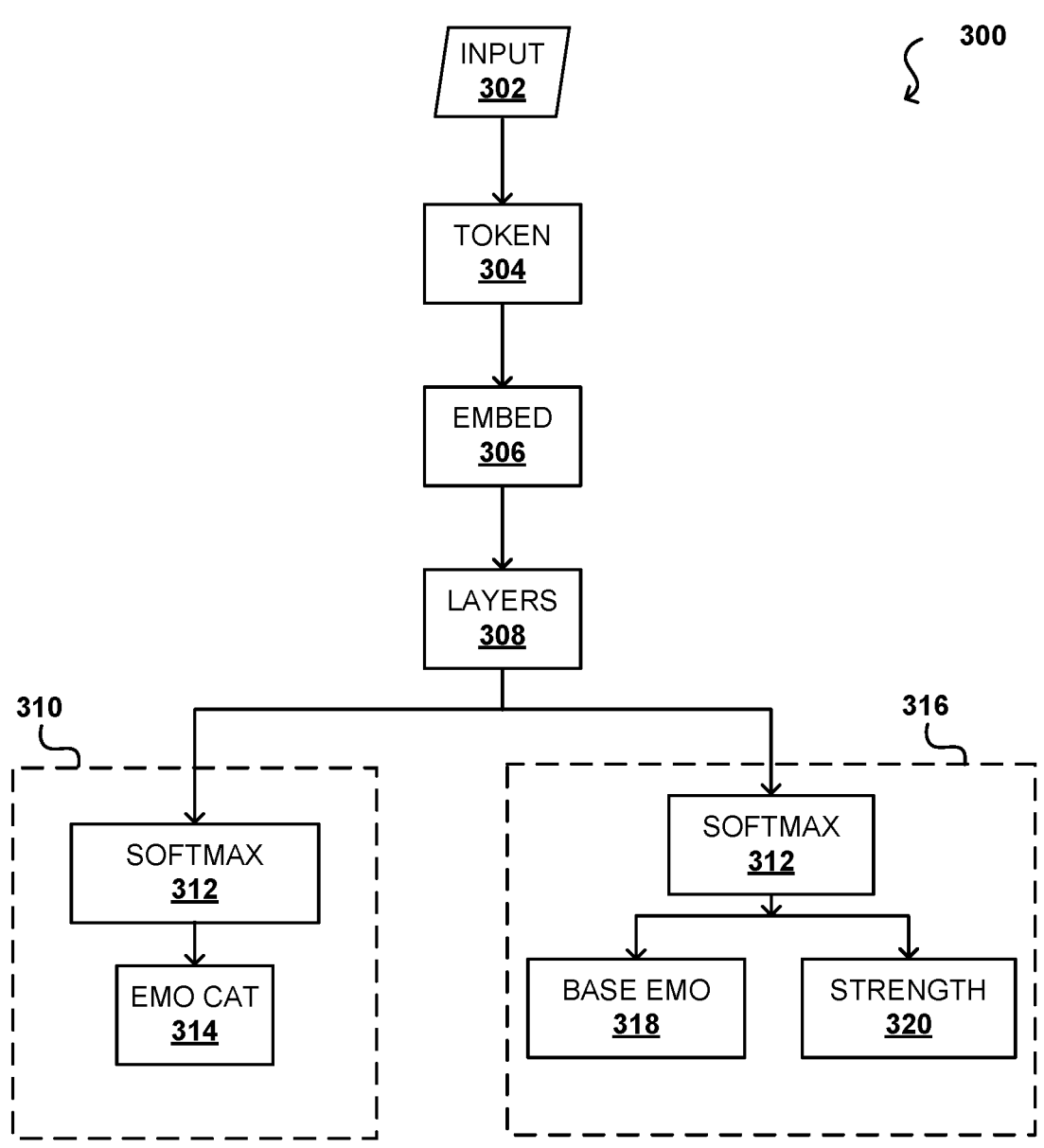
FIG. 3A illustrates an example architecture for an emotion model, in accordance with various embodiments.

FIG. 3A illustrates an example architecture 300 for a recurrent convolution neural network (RCNN) that may be deployed with embodiments of the present disclosure. For example, the RCNN may be a character-level language model that uses byte-pair encoding (BPE) to classifier different characters, words, or sub-words. Various embodiments use character-level RCNN language models to encode, from BPE tokens, both semantic and orthographic information. In this example, an input 302 is provided for processing by the network. The input 302 may correspond to the input 106 and/or may be a modified version of the input 106. For example, the input 302 may be a textual input that has been converted from an original audio input, among other options. A tokenizer 304 is used to tokenize each BPE in the sentence and then an embedding layer 306 converts each BPE token into dense vector spaces, similar to a bag of words neural language model. Next, the embeddings are fed into layers 308 of a CNN with various kernel sizes. Then, the vectors are transferred to a recurrent neural network (RNN) layer(s) (which may be part of the layers 308) in which long-short term memory (LSTM) units are employed. After processing through the layers 308, different strategies may be used in order to obtain emotional classifications. The states of RNN are regarded as feature vectors and are passed to the softmax layer for multiple category emotion classification.

A first strategy 310 may deploy a softmax layer 312 to generate a final emotional classification 314. With the first strategy 310, a combined target label set is used to define eight dimensions of emotions and each emotion with three levels of strength (e.g., weak, middle, strong), and then each are combined together for a target label set of 24 total categories. Furthermore, as noted herein, there are an additional eight categories that do not have a "strength" attribute. As a result, the emotional classifications are delineated within 32 categories. A second strategy 316 similarly uses the softmax layer 312, but in this category the eight dimensions are simultaneously determined with a base classification 318 along with their strength classification 320 as two output vectors and an additional set of vectors may be determined for the eight categories that do not have a strength attribute as part of the base classification 318.

In at least one embodiment, the recurrent layer of the present architecture takes the output from a single layer BPE token-level CNN with max-over-time pooling as an input. LSTM addresses the learning of long-distance dependencies and the gradient vanishing problem by augmenting the traditional RNN with a memory cell vector $c_t \in \mathbb{R}^n$ at each time step. One step of an LSTM takes an input $(x_t, h_{t-1}, c_{t-1})$ and produces $h_t$ and $c_t$ using the following operations:

$$i_t = \sigma\left(W^i x_t + U^i h_{t-1} + b^i\right)$$

$$f_t = \sigma\left(W^f x_t + U^f h_{t-1} + b^f\right)$$

$$o_t = \sigma\left(W^0 x_t + U^0 h_{t-1} + b^0\right)$$

$$g_t = \tanh(W^g x_t + U^g h_{t-1} + b^g)$$

$$c_t = f_t \otimes c_{t-1} + i_t \otimes g_t$$

$$h_t = o_t \otimes \tanh(c_t)$$

where $\tan h$ and $\sigma$ are the element-wise sigmoid and hyperbolic tangent functions, $\otimes$ is the element-wise multiplication operator, and $i_t$, $f_t$, $o_t$ respectively denote input, forget, and output gates. When $t=1$, $h_0$ and $c_0$ are initialized to be zero vectors. Parameters to be trained of the LSTM layer are matrices $W^j$, $U^j$, and the bias vector $b^j$ for $j \in \{i, f, o, g\}$.

CNNs have achieved state-of-the-art results on computer vision tasks such as the ImageNet shared tasks and have also shown to be effective for various NLP tasks. Since NLP task inputs are one-dimension word orders instead of 2D images, the CNN architectures employed for NLP applications differ in that they typically involve temporal rather than spatial convolution functions. Let $Q \in \mathbb{R}^{d*|V|}$ be the BPE-token embedding matrix, with d being the dimensionality of BPE-token embedding and V being the BPE-token vocabulary set. For a given word (w), l BPE tokens could be represented as $w=c_1, \ldots, c_l$. Then, the BPE-token-level representation of w is given by a matrix $C^w \in \mathbb{R}^{d^l}$, where the j-th column corresponds to the BPE-token embedding for $c_j$ which is further the $c_j$-th column of Q. Applying a narrow convolution between $C^w$ and a filter (or convolutional function) $H \in \mathbb{R}^{df}$ of width f, after which a bias is added, and then nonlinearity is applied to obtain a feature map $f^w \in \mathbb{R}^{l-f+1}$. Specifically, the i-th element of $f^w$ is given by: $\mathbb{R}$ $$f^w[i] = \tanh(< C^w[*, i:i+f-1], H > +b])$$

where $C^w[*, i: i+f-1]$ is the i-to-(i+f-1)-th column of $C^w < A, B >= Tr(AB^T)$ is the Frobenius inner product. Finally, outputs of the convolution operations are used to capture the most important features in temporal order by the LSTM layer. Various features may be deployed according to the following pseudocode:

```
#embedding layer, generate the emotion vector for each bpe-token:
embed__id=L.EmbedID(voc__size, 256), # embedding layer, voc__size = bpe-token
vocabulary size, and each bpe-token is projected into a 256-dimension vector with
float values
# pretrained BERT style language model (project from 256 to 256).
# convolutional layer
conv1__w3=L.Convolution2D(256, 256, (3, 1), 1, (1, 0), # (3,1) = filter size,
1=stride, (1,0)=pad
conv1__w5=L.Convolution2D(256, 256, (5, 1), 1, (2, 0)), # (5,1) = filter size,
1=stride, (1,0)=pad
conv1__w7=L.Convolution2D(256, 256, (7, 1), 1, (3, 0)), # (7,1) = filter size,
1=stride, (1,0)=pad
conv1__w9=L.Convolution2D(256, 256, (9, 1), 1, (4, 0)), # (9,1) = filter size,
1=stride, (1,0)=pad
# recurrent layer
```

-continued

```
1stm=L.LSTM_bidirectional(1024, 256), # 1024 is the dimension from 4 CNN
filters, that is 1024 = 4 * 256; the hidden layer vector is 256-dimension (with 128
for left-to-right RNN and another 128 dimensions for right-to-left RNN)
fc1=L.Linear(256, 256), # full connection layer, again from 256-dimension to
256-dimension
# output layer, strategy 1 (refer to Figure 5)
fc2=softmax(L.Linear(256, 32)) # another full connection layer, with an input of
256 dimension and an output of 32 dimensions (which corresponds to the 32
emotions)
#output layer, strategy 2 (refer to Figure 5)
Fc3 = softmax(L.linear(256, 16)) # where 16 = 8 + 8 stands for the 8 basic
emotion categories with "strength" levels and another 8 combined emotion
categories without "strength" levels;
Fc4 = softmax(L.Linear(256, 3)) # where 3 stands for weak, middle and strong,
the "strength" levels of the categories with "strength level"
```

Figure 3B:
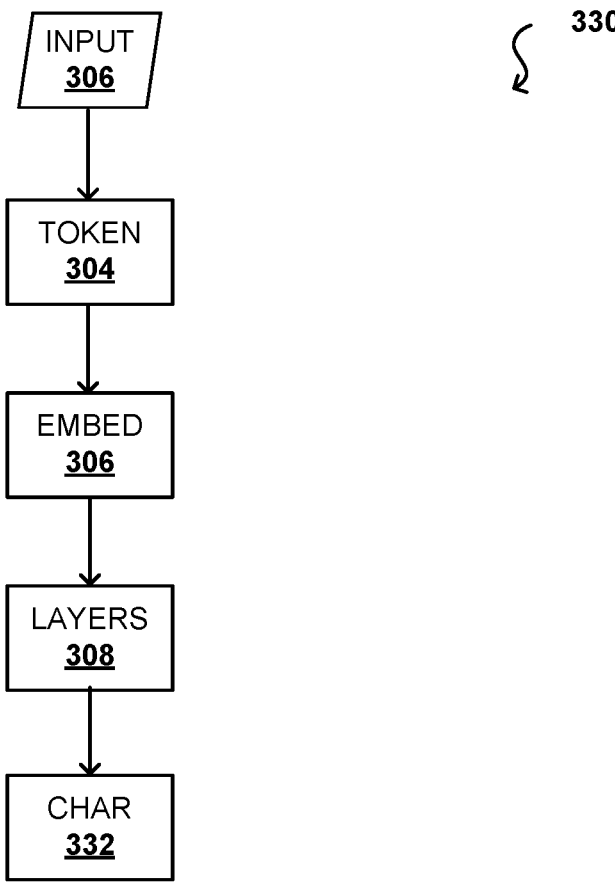
FIG. 3B illustrates an example architecture for a character model, in accordance with various embodiments.

A similar architecture as that of FIG. 3B may be used with respect to input phrases or words that are used to classify different character traits. For example, FIG. 3B illustrates an example architecture 330 in which the input 302 is provided for tokenizing and embedding, as described above. Thereafter, multiple layers 308 (e.g., CNN layers and RNN layers), may process the input to 302 in order to classify the input as one of the five big personality types 332 described herein. Various features may be deployed according to the following pseudocode:

```
#embedding layer, generate the emotion vector for each bpe-token:
embed_id=L.EmbedID(voc_size, 256), # embedding layer, voc_size = bpe-token
vocabulary size, and each bpe-token is projected into a 256-dimension vector with
float values
# pretrained BERT style language model (project from 256 to 256).
# convolutional layer
conv1_w3=L.Convolution2D(256, 256, (3, 1), 1, (1, 0), # (3,1) = filter size,
1=stride, (1,0)=pad
conv1_w5=L.Convolution2D(256, 256, (5, 1), 1, (2, 0)), # (5,1) = filter size,
1=stride, (1,0)=pad
conv1_w7=L.Convolution2D(256, 256, (7, 1), 1, (3, 0)), # (7,1) = filter size,
1=stride, (1,0)=pad
conv1_w9=L.Convolution2D(256, 256, (9, 1), 1, (4, 0)), # (9,1) = filter size,
1=stride, (1,0)=pad
# recurrent layer
1stm=L.LSTM(1024, 256), # 1024 is the dimension from 4 CNN filters, that is
1024 = 4 * 256; the hidden layer vector is 256-dimension
fc1=L.Linear(256, 256), # full connection layer, again from 256-dimension to
256-dimension
# output layer
fc2=L.Linear(256, 8) # another full connection layer, with an input of 256
dimension and an output of 8 dimensions (which corresponds to the 8 emotions)
```

Figure 3C:
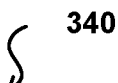
FIG. 3C illustrates an example architecture for a text-to-speech model incorporating emotion and character traits, in accordance with various embodiments.

FIG. 3C illustrates an example architecture 340 that can be deployed with embodiments of the present disclosure. The illustrated architecture incorporates the architectures from FIGS. 3A and 3B in order to provide both an emotion model and a character model that can be used with a text to speech (TTS) diffusion model. In this example, the architecture 340 includes two quantified models respectively for emotions 342 and characters 344, a text encoder 346, a step encoder 348, a duration predictor 350, a regulator 352, and a decoder 354.

Emotion is attached to each word in the input 306, which in this example is a textual sequence. The emotion model 342 may be based, at least in part, on the architecture described herein and may be used to generate an emotional category and strength for each portion of the input 306 (e.g., word basis, phoneme basis, syllable basis, subword basis, character basis, etc.). The strength of each emotional category may be normalized within a range of [0 to 1], which can be countless. A quantization network may be incorporated to use countable numbers of vectors to approximate the "countless" number of emotional strengths. Similarly, the character model 344 may apply a similar quantified value to the character associated with the user of the input 306. As a result, each of the models may generate respective emotion labels 356 and character labels 358, which may be provided as an input to the text encoder 346.

In at least one embodiment, the text encoder 346 extracts contextual information from phoneme sequences or syllable sequences (or sentence pieces subwords), then provides the information to the duration predictor 350 and the regulator 352. The encoder 346 may include a pre-net with embedding and a fully connected (FC) layer with ReLU activation. Then, the text encoder 346 takes phoneme/syllable/subword embedding as input. The encoder module may be composed of ten residual blocks with dilated convolution and an LSTM layer, but this specific configuration is provided by way of example only. The dilations of the convolution, as one example, may be [1, 2, 4, 1, 2, 4, 1, 2, 4, 1] from the bottom to the top, and the kernel size may be four with ReLU activation function followed by layer normalization.

Further illustrated are the duration predictor 350 and length regulator 352. In operation, the length regulator 352 is used to match the length of phoneme/syllable/subword and mel-spectrogram sequence. The length regulator 352 uses alignment information to expand the phoneme sequence and control the speed of speech. In at least one embodiment, Montreal forced alignment (MFA) may be used instead of an attention-based alignment extractor, which is commonly used in auto-regressive (AR) models. The MFA provides more robust alignment than the attention-based alignment and thus improves the alignment accuracy. The duration predictor 350 predicts in the logarithmic domain by using the duration extracted from MFA, which makes the duration prediction stable. The duration predictor may be optimized to minimize the L1 loss function. As shown, in the example architecture, the text encoder 346 may generate emotion and character predictions 360, 362, which may be used by the length regulator 352.

Various embodiment also include the decoder 354 and step encoder 348. Additional inputs are provided to these operators, including a step embedding 364 and a noise 366. The decoder 354 predicts Gaussian noise from the t-th step latent variable conditioned on phoneme embedding and diffusion step embedding. The decoder 354 takes the step embedding 364 from a step encoder to be informed about the diffusion time-step so that each diffusion time-step has a different $\varepsilon_\theta(\bullet, t, c)$. The diffusion step embedding may be a sinusoidal embedding with a 128-dimensional encoding vector for each t. The step encoder 348 is constructed, in this non-limiting example, using two fully connected layers and Swish activations. The decoder network in this embodiment consists of a stack of 12 residual blocks with Conv1D, tan h, sigmoid, and 1×1 convolutions with a 512-dimension residual channel.

As shown, the phoneme/syllable/subword embedding is expanded by the length regulator 352. Then, the phoneme embedding, and the output of the step encoder 348, are added to the input after the Conv1D layer. The Conv1D layer may have a kernel size of three without dilation. After going through a residual block, the outputs are summed up before post-net. Finally, the decoder 354 obtains the Gaussian noise corresponding to phoneme sequence and diffusion time-step. Embodiments may then quantize the original dense representation of emotional strengths into two vocabulary sets with 320 entries in each set. The obtained tensor is concatenated to the output tensor of the text encoder. This quantified model is also applicable to character strength description. For each direction of character, there is still a "strength" of how likely is that character attached to current textual sequence. With the similar quantified model, the original dense representation of character dense tensor is projected into two vocabulary sets with 320 entries in each set. Accordingly, a voice output 368 may be generated in which features of the character trait and emotion of the speaker are used to augment or adjust various portions of the output audio.

Figure 3D:
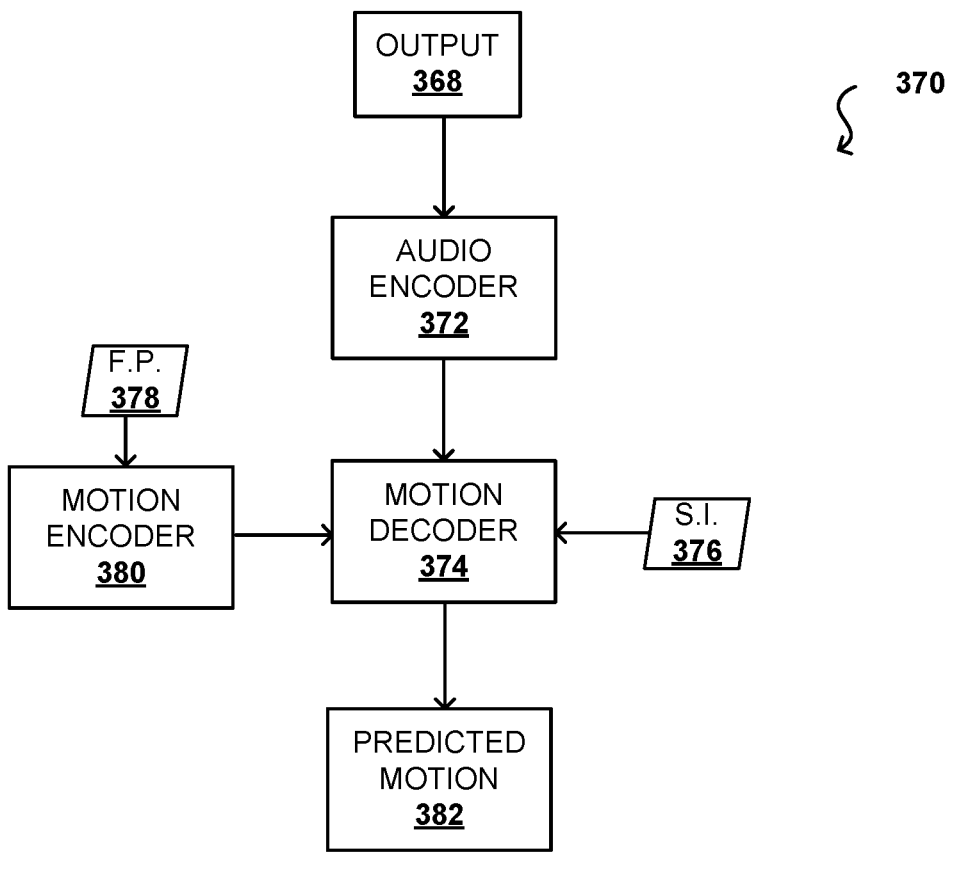
FIG. 3D illustrates an example architecture for a motion prediction model incorporating emotion and character traits, in accordance with various embodiments.

FIG. 3D illustrates an embodiment of an architecture 370 that may be used with embodiments of the present disclosure to provide an autoregressive audio2face network (e.g., a network that takes text generated from audio as input, and generates outputs used to animate or control features—or feature points—of a face of a digital avatar) that may take, as an input, the output 368 from the architecture 340. In this example, the architecture 370 may be an attention-enhanced deep convolution network architecture that takes raw audio as input and autoregressively generates a sequence of animated 3D face meshes. In this example, the raw audio input corresponds to the output 368, but in various embodiment different audio inputs may be provided. An audio encoder 372 may receive the output 368 to generate one or more inputs that are fed into a face motion decoder 374. For example, embodiments of the audio encoder 372 may include a modified Conformer architecture that integrates sparse attentions guided by a query spareness measurement along with deep normalization which weight input tensors during residual connection into Conformer.

The face motion decoder 374 may be an audio2face decoder (which may share features with a transformer decoder with cross-attention between a target video sequence and source encoded audio memory as keys and values). A first face motion decoder module may incorporate a biased causal multi-head (MH) self-attention with a periodic positional encoding for generalizing to longer input sequences and a biased cross-modal MH attention for aligning audio-motion modalities.

In operation, the architecture 370 may incorporate one or more attention-enhanced deep convolution network to encode the audios as retrievable memory, key, and value in a cross-attention transformer decoder. Thereafter, these values may cooperate with transformer decoder to generate 3D facial motions with accurate lip movements. For example, the face motion decoder 374 may receive, as another input, past face motion predictions 378 generated by a motion encoder 380, a speaker identity vector 376 that may be used to generate a mesh, adjust positions of facial features for the speaker, and/or the like. An embedding associated with the vector 376 may be provided to a decoder, such as at a layer associated with periodic position encoding, and then, via one or more attention layers, be used to predict future face motions 382.

Figure 3E:
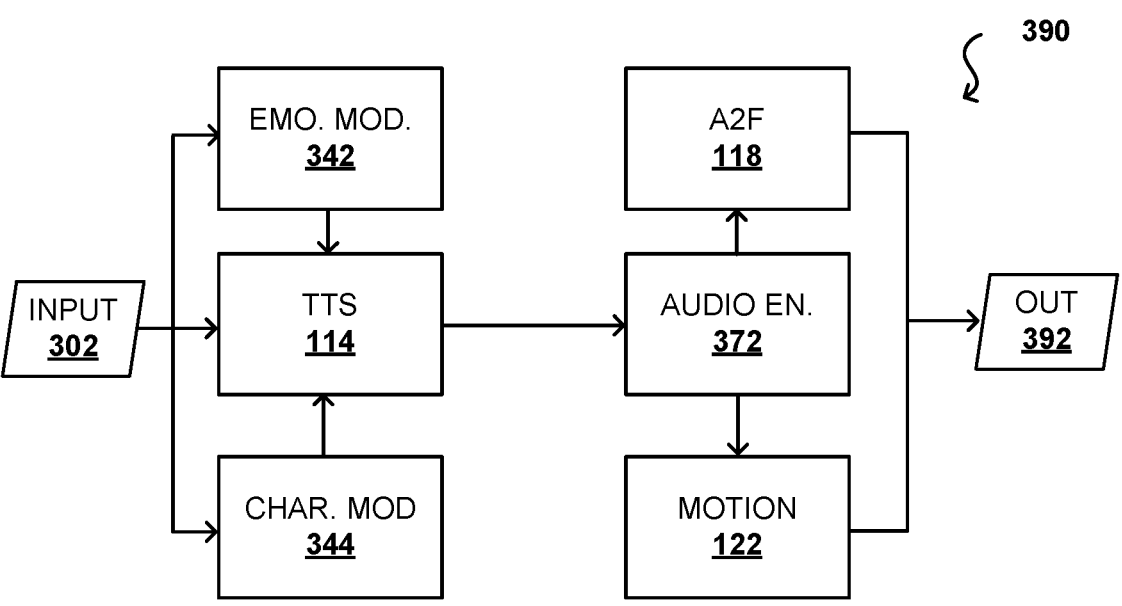
FIG. 3E illustrates an example architecture for a diffusion model incorporating emotion and character traits, in accordance with various embodiments.

FIG. 3E illustrates an example architecture 390 in which TTS, audio2face, and motion prediction models have been integrated in order to provide a full end-to-end system in which a textual input may be evaluated to identify emotional and character traits, converted to audio, and then rendered for use with a digital representation, such as a virtual avatar. In this example, the input 302 is provided to the TTS unit 114, which may share one or more features with the various architectures described herein, as well as to the emotion model 342 and the character model 344 in order to identify specific labels to feed into the TTS unit 114. The TTS unit 114 may generate an output audio segment that is provided to the audio encoder 372, as noted herein, which may then be used along with the A2F unit 118 and/or a motion unit 122 in order to generate an output representation 392 of a 3D character, such as a virtual avatar, an animated character, a video game character, and/or the like. Because rich emotional information is provided with the TTS unit 114, different elements of the user's characteristics and emotions may be carried through to the generation of the facial and body expressions, thereby providing a more realistic and accurate portrayal of the user.

Figure 4A:
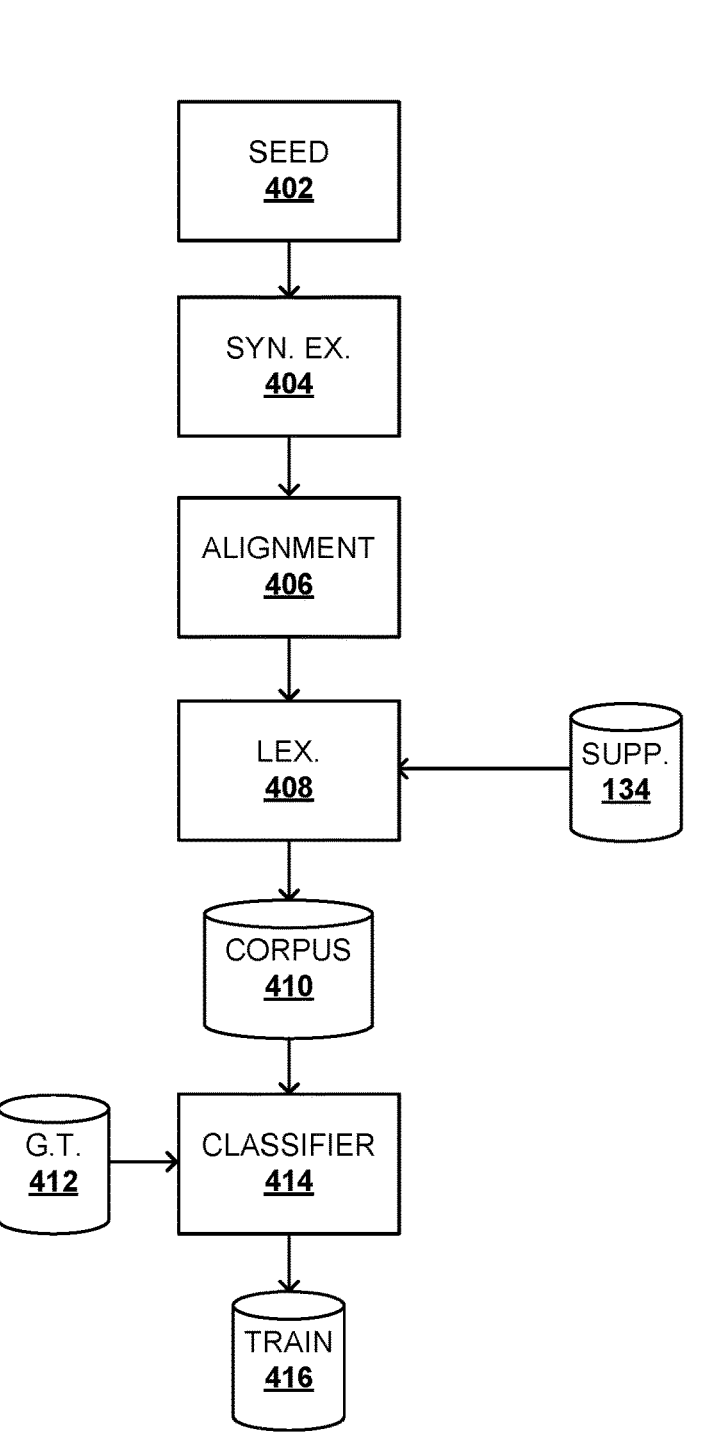
FIG. 4A illustrates an example architecture for obtaining training data for emotional trait identification, in accordance with various embodiments.

FIG. 4A illustrates an example architecture 400 for a data collection pipeline that may be used with embodiments of the present disclosure. In order to train a robust fine-grained emotion classification model, systems and methods may obtain large-scale training data in formats of <text, emotion category, strength> or <image, emotion category, strength>, as noted herein. Embodiments may obtain a set of defined seed words 402 for each of the 32 emotion categories that may be used for the final classifications described herein. A synonym extender 404, such as word2vec, may be deployed with the seed words 402 as an input in order to extend the list of words by using a similarity score between a seed word and a synonym candidate of the seed word. In examples that use word2vec, cosine similarity may be used to determine word similarity. Word2vec is a method of embedding words and the output vector is trained to reconstruct linguistic contexts of words. For example, the word "joy" and "delight" have similar vector representation because these two words are used in similar contexts and positions in the sentences. Synonyms may be selected based on whether or not they are sufficiently similar (e.g., within a threshold) to the seed words. Various embodiments may be described with reference to word2vec, but other embodiments may incorporate different methods and models to extend and identify additional seed words.

In certain embodiments, similarity scores alone may be insufficient to identify the synonyms and/or may inadvertently assign antonyms. For example, the word "sad" is likely to have high similarity score with "joy" because these two words are likely to appear in the same position, or with similar context words, in many sentences. That is, the behind problem is that words such as "black" and "white" will have a relatively high similarity score since they both are adjectives and are used to modify the color of some objects. Systems and methods address and overcome this problem by pruning inadequate words using word alignment 406. Various embodiments incorporate bilingual word alignment tables for further collecting and pruning the expanded seed emotional words. For example, alignment between an English-language word and a Japanese-language word may be used.

As mentioned, word2vec cannot guarantee that the result words share a "similar" meaning. For example, "sadness" may inadvertently be found to be similar with "forever" and "happiness." By incorporating the bilingual word alignment tables, these cases may be excluded. That is, after word2vec word extension, embodiments may further retrieve a Japanese-to-English word alignment table, as one example, for finding English words that are aligned with their associated Japanese character. Using such methods may identify four words similar to "sadness" such as: "sad", "unhappy", "sorrowful", and "pathetic." Embodiments may also use the word alignment table in another direction (e.g., English-to-Japanese for the above example) to obtain Japanese words for each English word. All these Japanese words will form another word list. Then, an "intersection" operation may be used with the word list from word2vec and from word-alignment. The result word list will be taken as synonyms of the input, which in this example is "sadness," and will be appended to form a seed word lexicon 408.

Various embodiments may also supplement the seed word lexicon 408 by manually collecting additional information, such as emoji/kaomoji from the web, and then appending those additions to the seed word lexicon 408. The result seed word lexicon 408 may be used to find sentences from a corpus of information 410, such as web data (e.g., Twitter), that contain at least one seed word.

However, using maximum length matching style methods to collect the final large-scale training data using the seed word lexicon may present some challenges. For example, "not"-series words will switch the original emotion into a contrary direction. As another example, one sentence can contain both positive words and negative words in a mixed way such as "praise first and then criticize" or "criticize first and then praise." Furthermore, there may be a gap between the "strength" of one seed emotion word and the "strength" of one sentence that includes the seed emotion word. That is, the sentence is not ensured to be following exactly the same strength of the seed emotion word's strength. For example, for one word "angry," its strength of emotion to be assigned as "middle" anger. However, in a sentence alike "he was extremely angry, and he grabbed a weapon," the strength of the total sentence should better be annotated to be "strong" anger. Moreover, some seed words can extend some new synonym words that makes its strength to be changed from the original seed emotion word. Embodiments address these problems by providing ground truth data 412, such as manually annotated seed training data with 1,000 instances per category.

Regarding the ground truth data 412, the data may be manually annotated <x, y> with 1,000 instances per category. One target for this data is to determine the basic categories of one sentence (eight primary categories+eight combined categories that do not have strength levels). A further target is to determine the strength {weak, middle, strong} for the eight primary categories that have strength levels. For example, if the sentence is about "love," then the annotator does not need to further determine its "strength" because, as noted within Plutchik's wheel, "love" is a combination of "joy" and "trust" without an associated strength. On the other hand, if the category is about "anger," then the annotator is required to label the "strength" of the sentence as well because, returning to Plutchik's wheel, "anger" has different levels, such as "rage" and "annoyance."

Various embodiments train a SVM classifier 414 that uses trigram BPEs as features. The classifier 414 makes a secondary judgement to the web data pre-filtered by the seed word lexicon 408. The sentences that have a relatively high confidence probability will be finally appended to a training set 416.

FIG. 4B illustrates a flow chart for an example process 420 to collect information using a personality test, which may be an implicit personality test, that may be used with embodiments of the present disclosure. It should be understood that for this and other processes presented herein that there can be additional, fewer, or alternative operations performed in similar or alternative order, or at least partially in parallel, within the scope of various embodiments unless otherwise specifically stated. As noted herein, various embodiments may deploy testing for different users to identify and collect information associated with character traits. Such methods may reduce the high cost and time commitment to perform explicit personality testing for thousands of people by integrating testing within a standard exchange with users. Various embodiments will receive permission from users prior to deploying such techniques. In this example, a user log information is identified over a period of time 422. The log information may include conversations the user has had with the system, such as a chat bot, or may include data provided to the system by the user indicative of their personality. The user log size and a ratio of emotional words within the log may be analyzed against a threshold and determined to exceed the threshold 424. For example, a user with little interaction and little to no emotional words may not provide sufficient information to identify personality information.

In at least one embodiment, it may be determined to proceed with personality testing 426. Various factors may be used to make the determination, including whether the user has opted-in to the service, whether the user is willing to conduct the test at a particular time, and the like. In at least one embodiment, a list of questions is prepared with the users associated answers, and the list may be annotated with a personality condition for the user 428. For example, one interaction may include the user indicating they are upset that they had to work on a group project because they prefer working alone, which may be indicative of introversion (e.g., negative extraversion). A session-question matching model may execute 430 in which the user is asked questions and user responses are evaluated using sentiment analysis, among other techniques, 432. It may be determined whether or not each question is answered 434, and if so, then personality testing results may be determined 436. Accordingly, data can be collected during normal interactions with users without the time and expense of trying to deploy individual testing at particular times for thousands of users.

Various embodiments may also allow the user to view their personality testing results, which may provide an incentive to participate in the testing. For example, a user may request to view their scores and different data may be presented to show their tendency toward one of the big five traits, their comparisons to others, and the like. Through the direct comparison of the individual user's scores with the average scores of others within the interaction environment, the characteristics of the individual user can be described in an evaluable and intuitive way.

FIG. 5A illustrates an example process 500 for rendering a digital face in an interaction environment. In this example, a first vector associated with an emotional classification of a textual input is determined 502. For example, the first vector may be determined from an emotion model that is based on psychological characteristics of emotion that uses, at least in part, one or more classifiers to identify emotional characteristics from one or more words within the input text and/or similar words. Various embodiments also determine a second vector associated with a character classification for the textual input 504. For example, a trained classifier may be used to identify character information for a user associated with the text based on personality testing, among other options.

The first and second vectors may be used with a trained TTS model in order to generate an audio sample of the textual input 506. By providing the input vectors, different features of the audio sample may be adjusted in accordance with the emotional and character traits. For example, pitch may be increased and speed may be increased if the emotion is related to excitement. As another example, volume may be reduced if the character trait is for an introverted person. Various embodiments may also generate a representation of a digital face using an A2F model in which the vectors and the audio sample are provided as inputs 508. The digital face may then be rendered within an interaction environment, such as in the form of a digital avatar 510.

FIG. 5B illustrates an example process 520 for generating a graphical representation of a digital avatar. In this example, one or more emotional features are determined from an input text 522, such as by using a trained classifier to extract emotional characteristics from the words used in the text. Additionally, embodiments also determine one or more character features based on the input text 524. This features may then be provided to a trained network to generate synthesized audio associated with the text 526, where the audio may incorporate the features identified. Thereafter, using the features and synthesized audio, a graphical representation of an avatar may be generated 528, such as by providing the features and audio as inputs to a trained A2F model.

As discussed, aspects of various approaches presented herein can be lightweight enough to execute on a device such as a client device, such as a personal computer or gaming console, in real time. Such processing can be performed on, or for, content that is generated on, or received by, that client device or received from an external source, such as streaming data or other content received over at least one network. In some instances, the processing and/or determination of this content may be performed by one of these other devices, systems, or entities, then provided to the client device (or another such recipient) for presentation or another such use.

Figure 6:
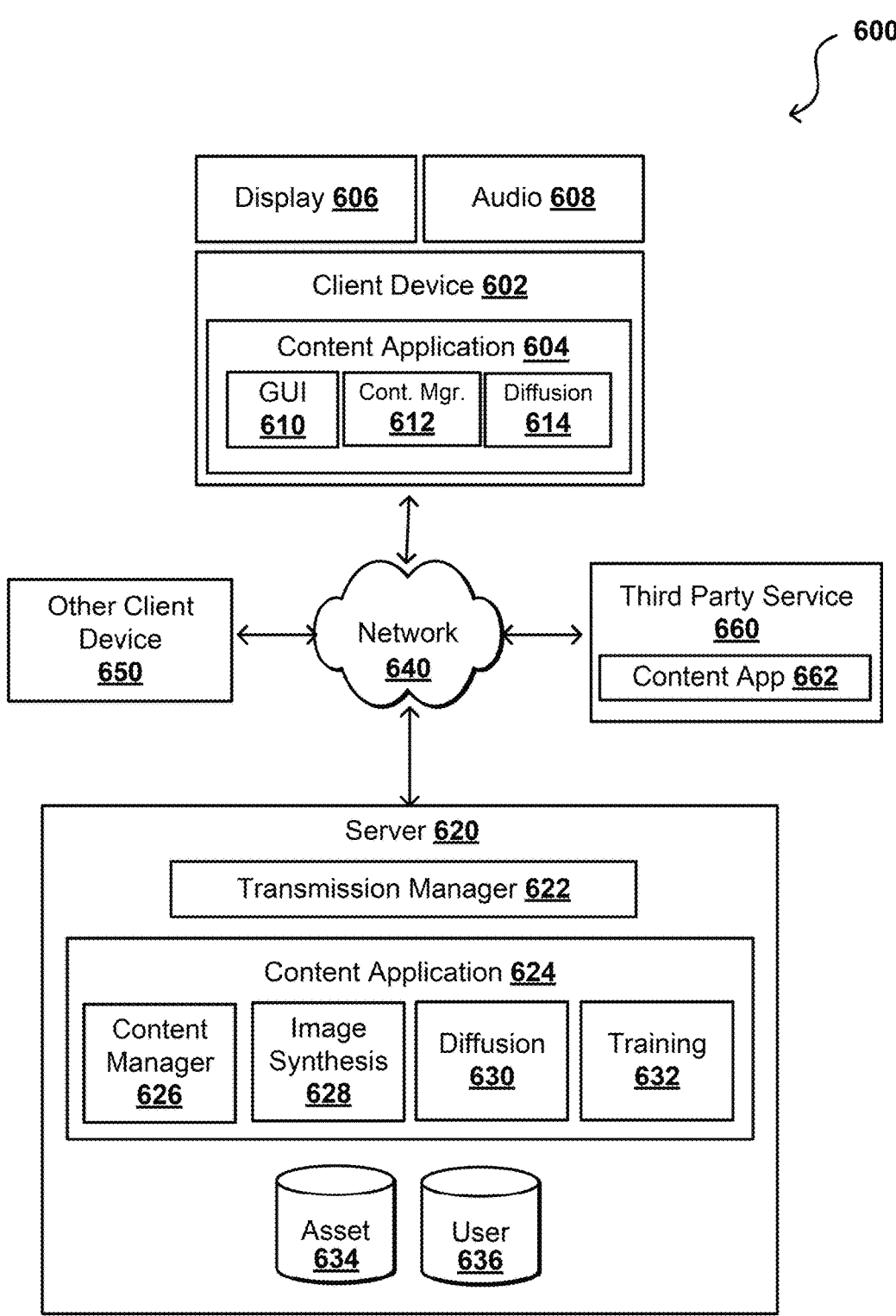
FIG. 6 illustrates components of a distributed system that can be used to update or perform inferencing using a machine learning model, according to at least one embodiment.

As an example, FIG. 6 illustrates an example network configuration 600 that can be used to provide, generate, modify, encode, process, and/or transmit image data or other such content. In at least one embodiment, a client device 602 can generate or receive data for a session using components of a content application 604 on client device 602 and data stored locally on that client device. In at least one embodiment, a content application 624 executing on a server 620 (e.g., a cloud server or edge server) may initiate a session associated with at least one client device 602, as may use a session manager and user data stored in a user database 636, and can cause content such as one or more digital assets (e.g., object representations) from an asset repository 634 to be determined by a content manager 626. A content manager 626 may work with an image synthesis module 628 to generate or synthesize new objects, digital assets, or other such content to be provided for presentation via the client device 602. In at least one embodiment, this image synthesis module 628 can use one or more neural networks, or machine learning models, which can be trained or updated using a training module 632 or system that is on, or in communication with, the server 620. This can include training and/or using a diffusion model 630 to generate content tiles that can be used by an image synthesis module 628, for example, to apply a non-repeating texture to a region of an environment for which image or video data is to be presented via a client device 602. At least a portion of the generated content may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding content application 604, which may also or alternatively include a graphical user interface 610, content manager 612, and image synthesis or diffusion module 614 for use in providing, synthesizing, modifying, or using content for presentation (or other purposes) on or by the client device 602. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
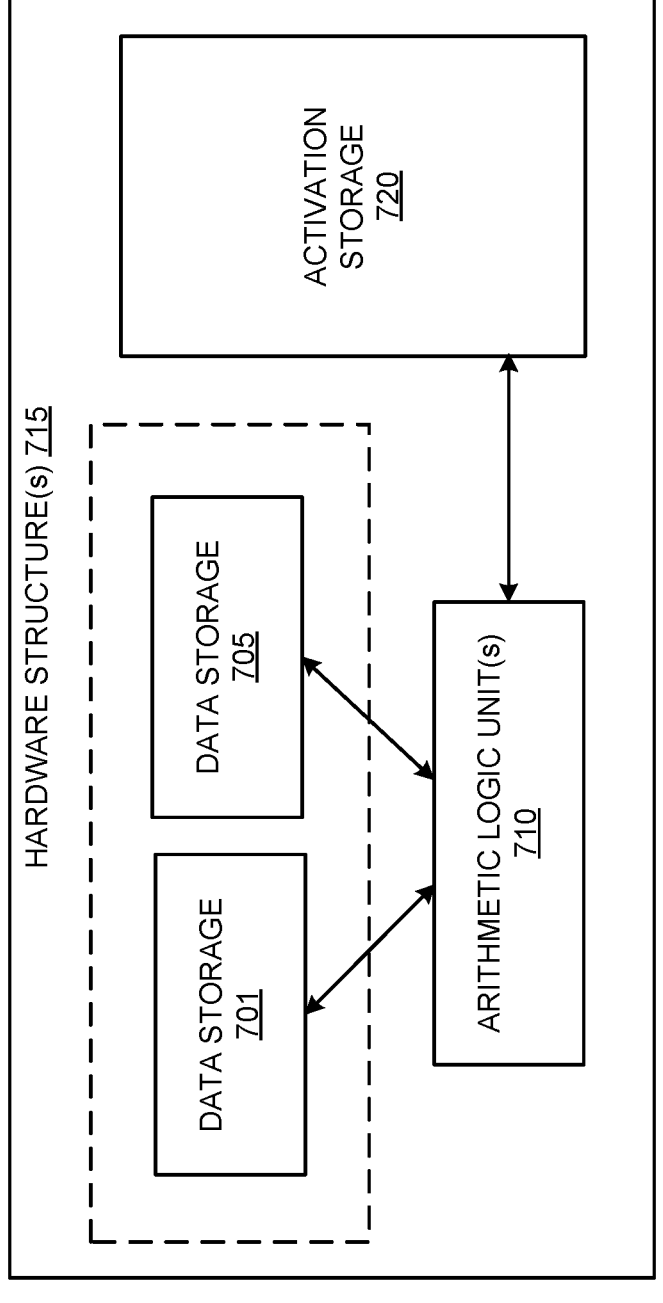
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7a may be used in conjunction with central processing unit ("CPU") hardware, graphics processing unit ("GPU") hardware or other hardware, such as field programmable gate arrays ("FPGAs").

Figure 7B:
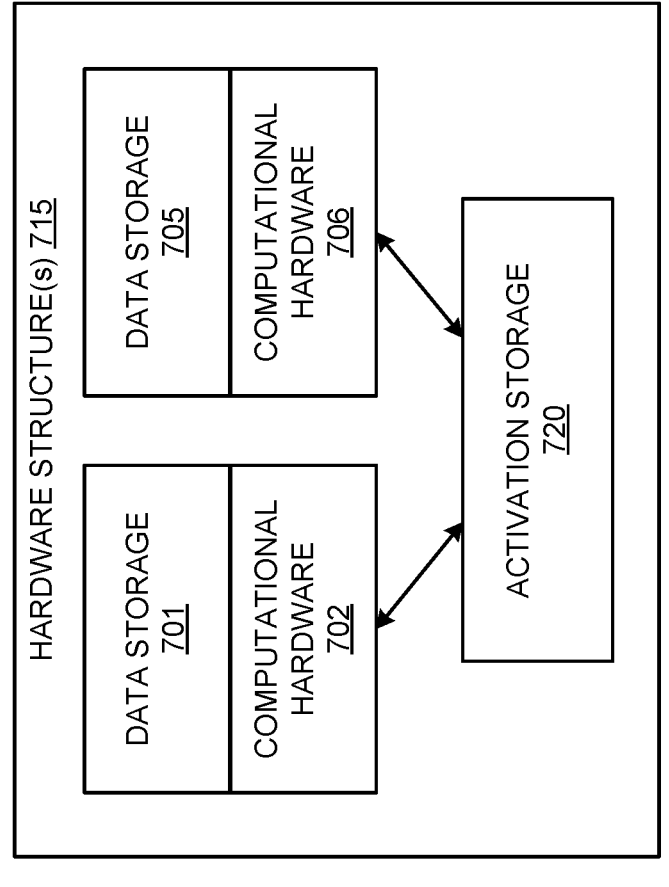
FIG. 7B illustrates inference and/or training logic, according to at least one embodiment.

FIG. 7b illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7b may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7b may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7b, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
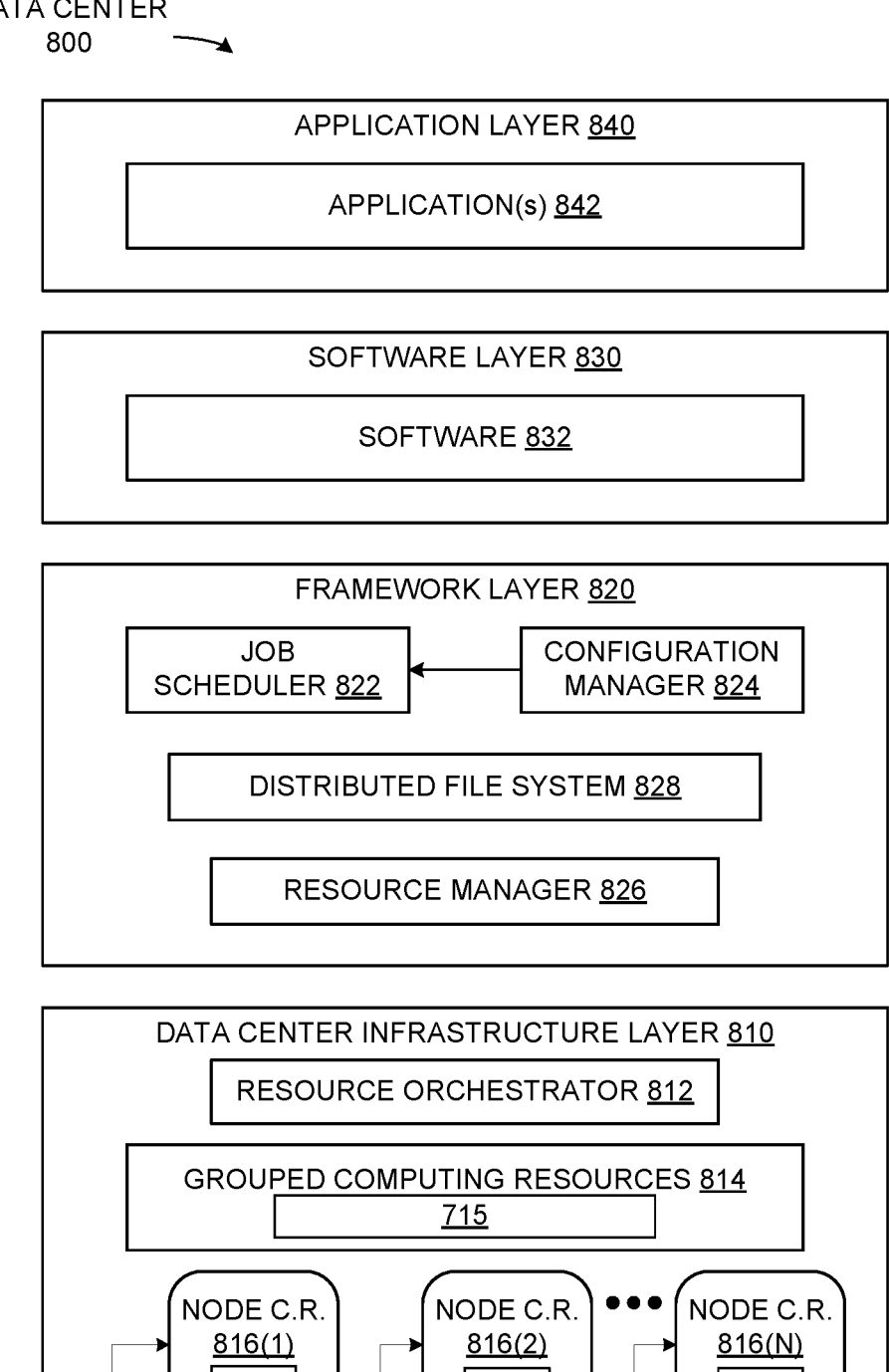
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7a and/or 7b8b. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used for content generation systems and applications.

Computer Systems

Figure 9:
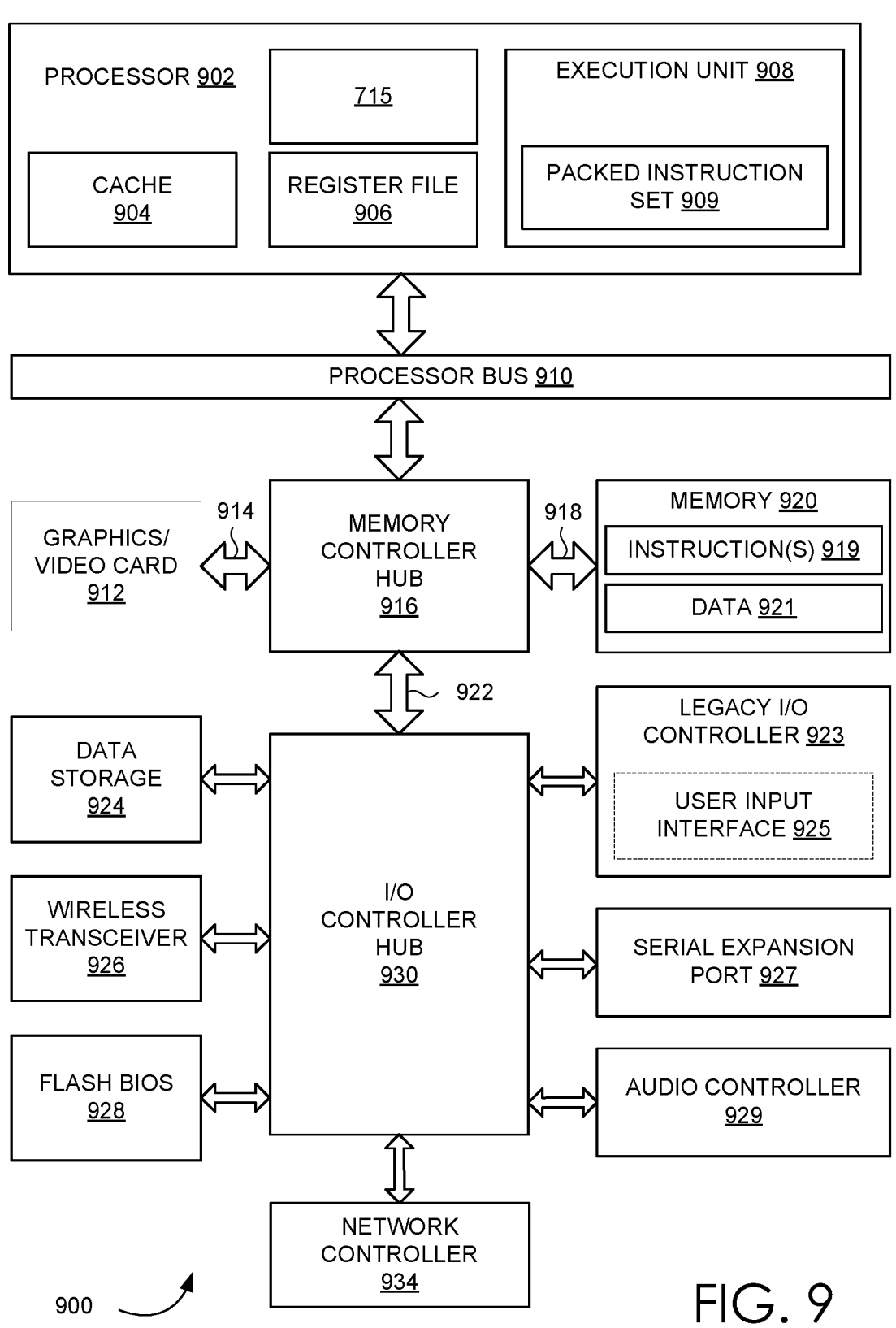
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7a and/or 7b8b. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used for content generation systems and applications.

Figure 10:
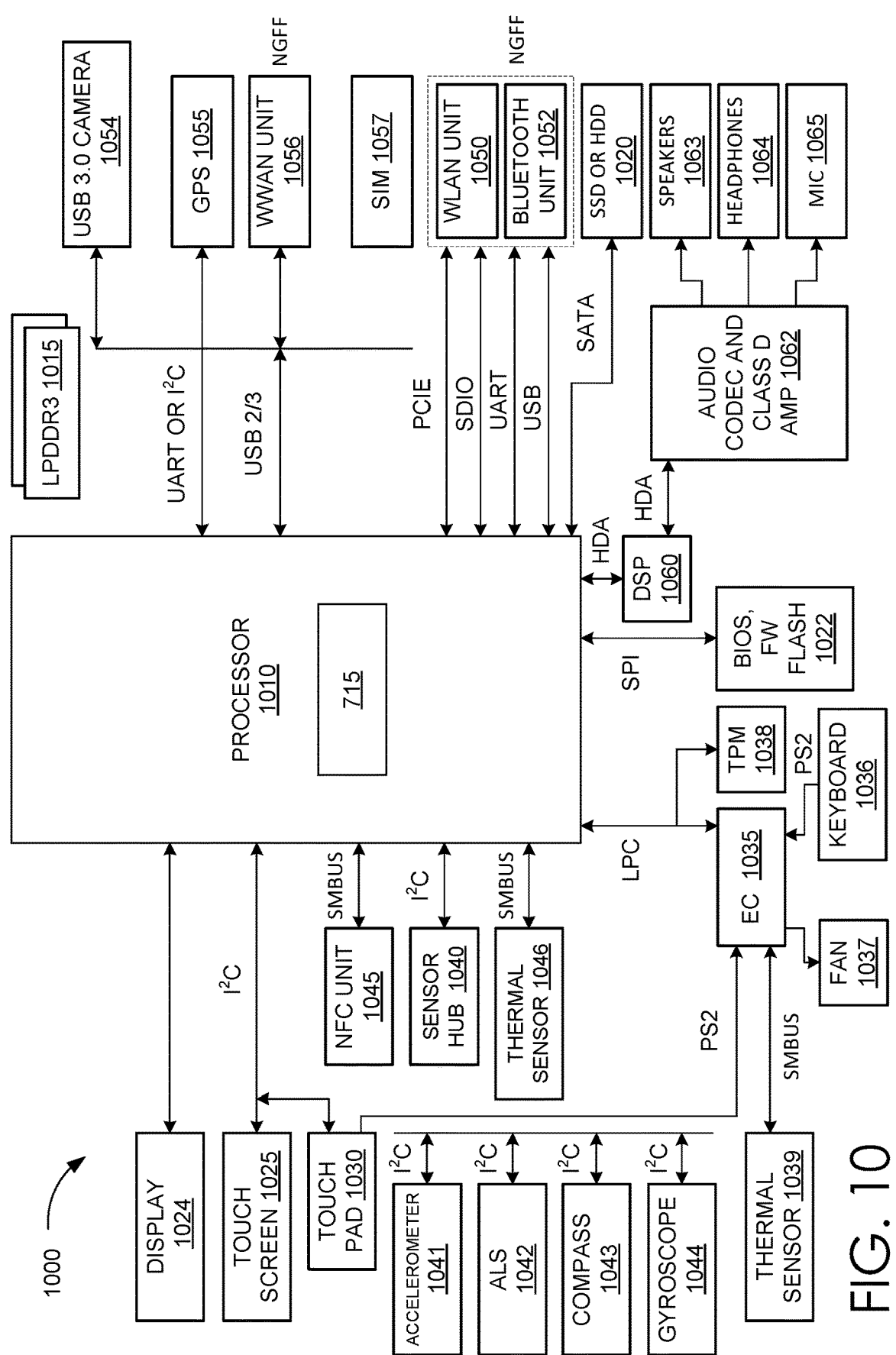
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1046, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7a and/or 7b8b. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used for content generation systems and applications.

Figure 11:
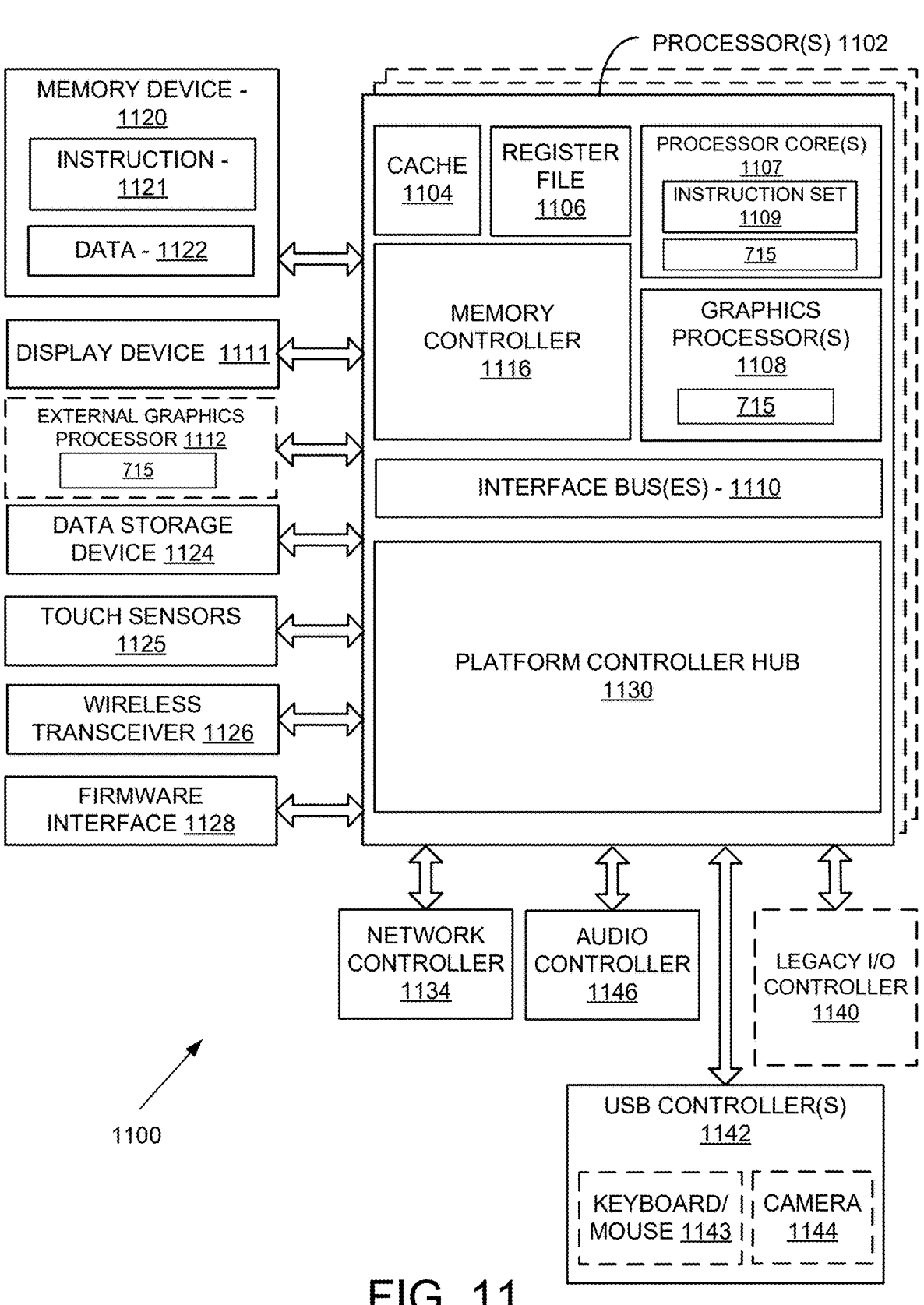
FIG. 11 illustrates at least portions of a graphics processor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7*a* and/or 7*b*8*b*. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 8A or 8B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used for content generation systems and applications.

Figure 12:
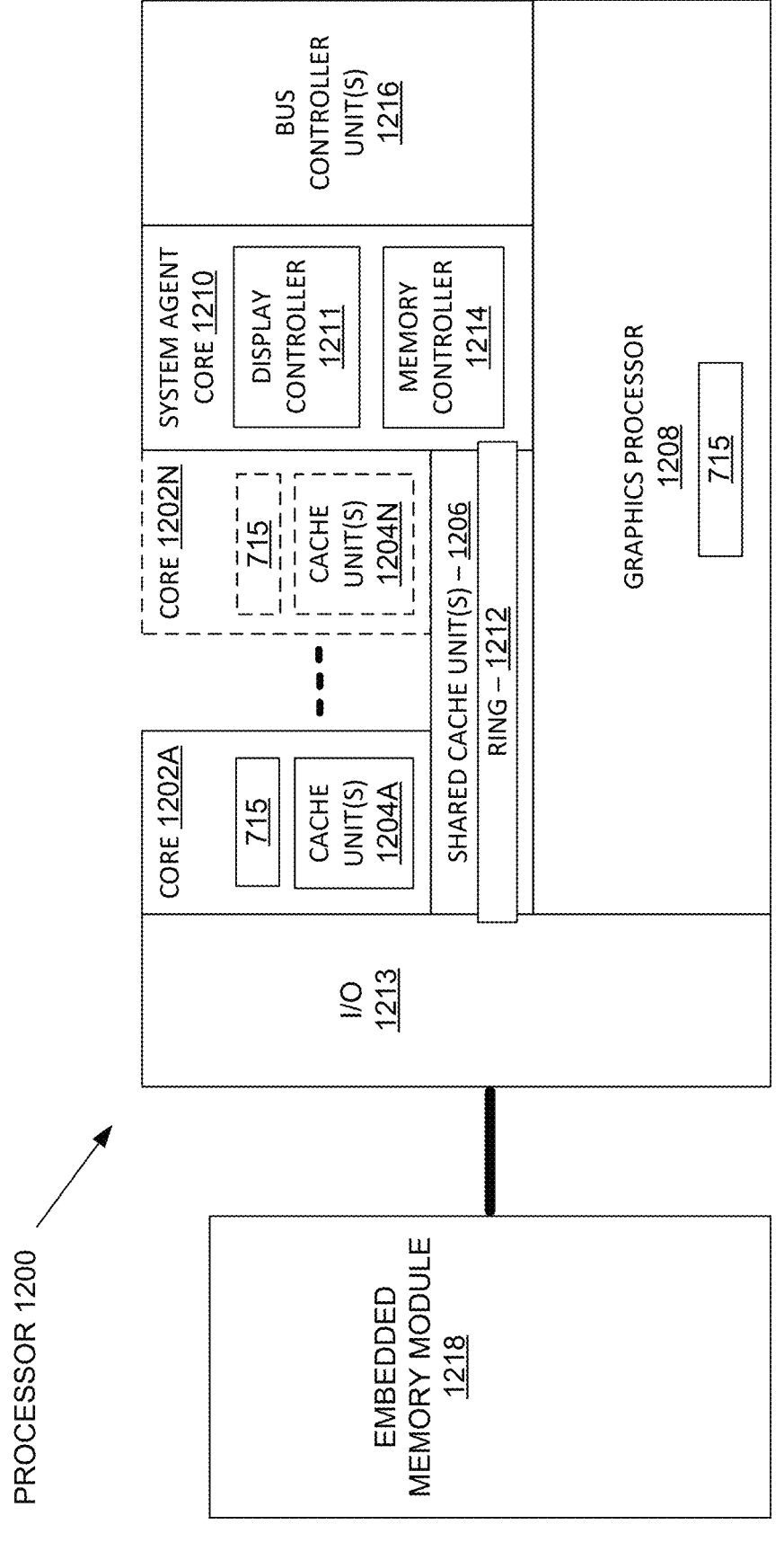
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multithreading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7a and/or 7b. In at least one embodiment portions or all of inference and/or training logic 715 may be incorporated into processor 1200. For example, in at least one embodiment, training and/or inferencing techniques described herein may use one or more of ALUs embodied in graphics processor 1212, graphics core(s) 1202A-1202N, or other components in FIG. 12. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used for content generation systems and applications.

Virtualized Computing Platform

Figure 13:
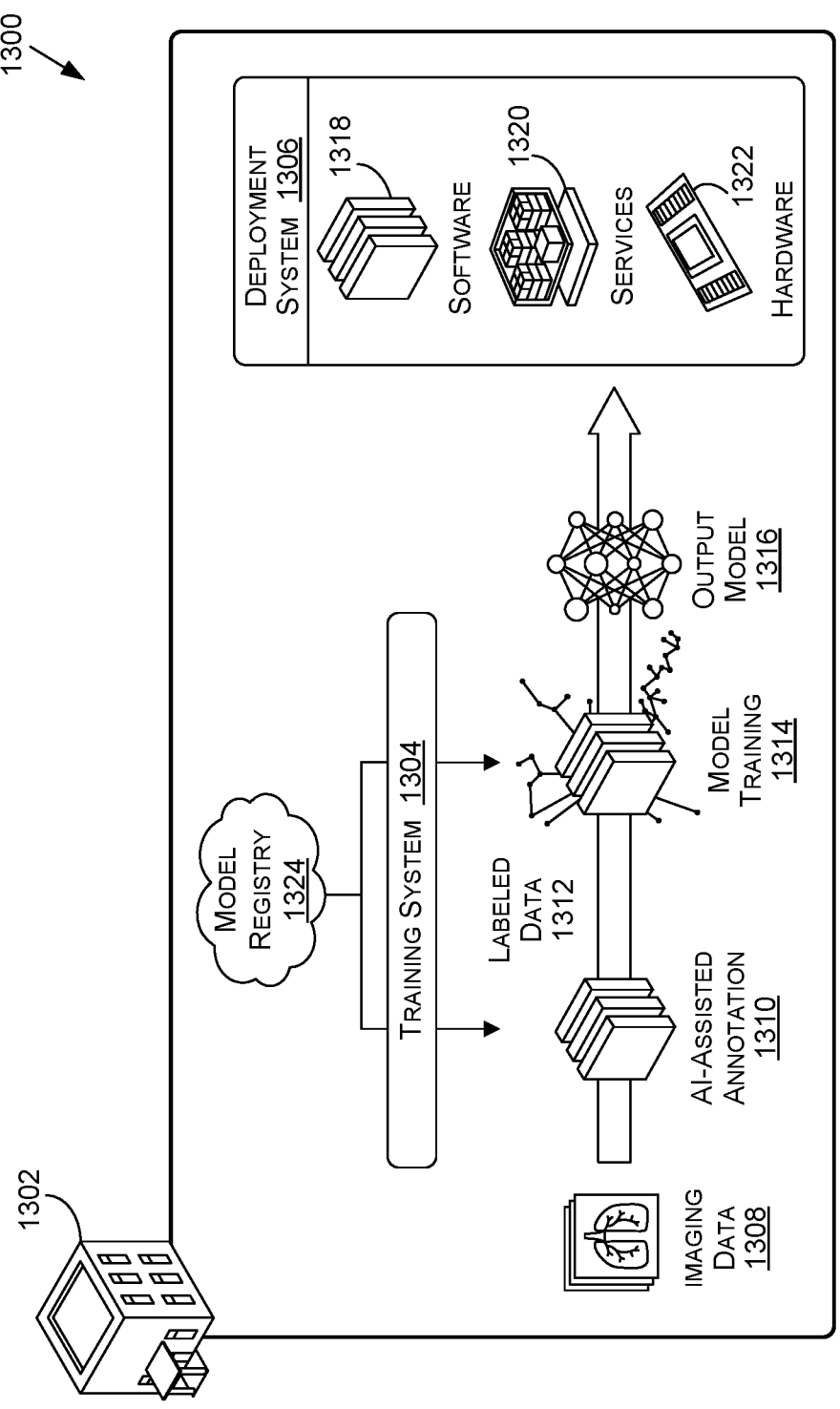
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility(ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1226 of FIG. 12) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1304 (FIG. 13) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, a training pipeline may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deployment system.

In at least one embodiment, a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1300 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1230 (FIG. 12)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 14:
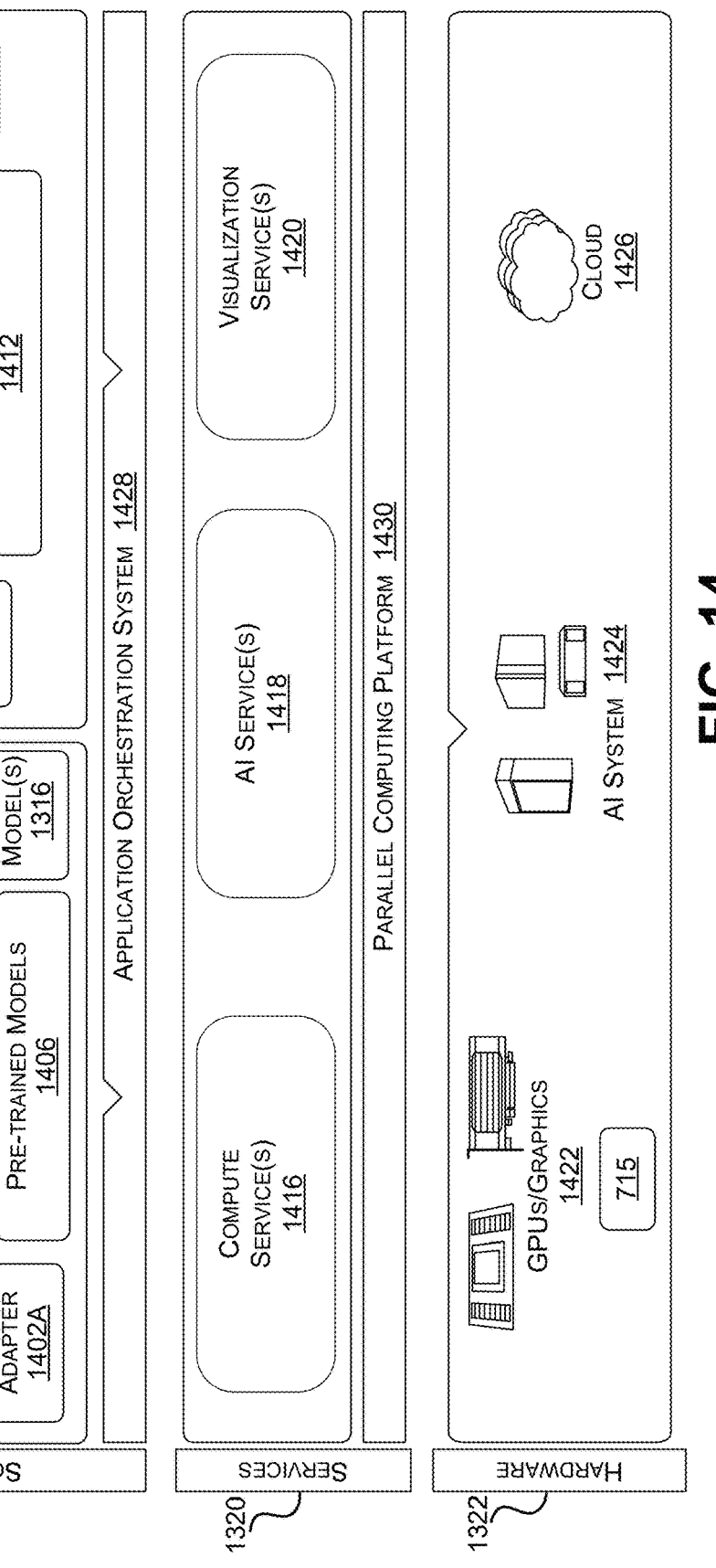
FIG. 14 is a system diagram for an example system for training, adapting, instantiating and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1404 may include AI-assisted annotation, as described in more detail herein with respect to at least FIG. 14B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an MRI machine, there may be a first deployment pipeline 1410, and where image enhancement is desired from output of an MRI machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipelines 1410 may be even more user friendly, provide for easier integration, and produce more accurate, efficient, and timely results.

In at least one embodiment, deployment system 1306 may include a user interface 1413 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
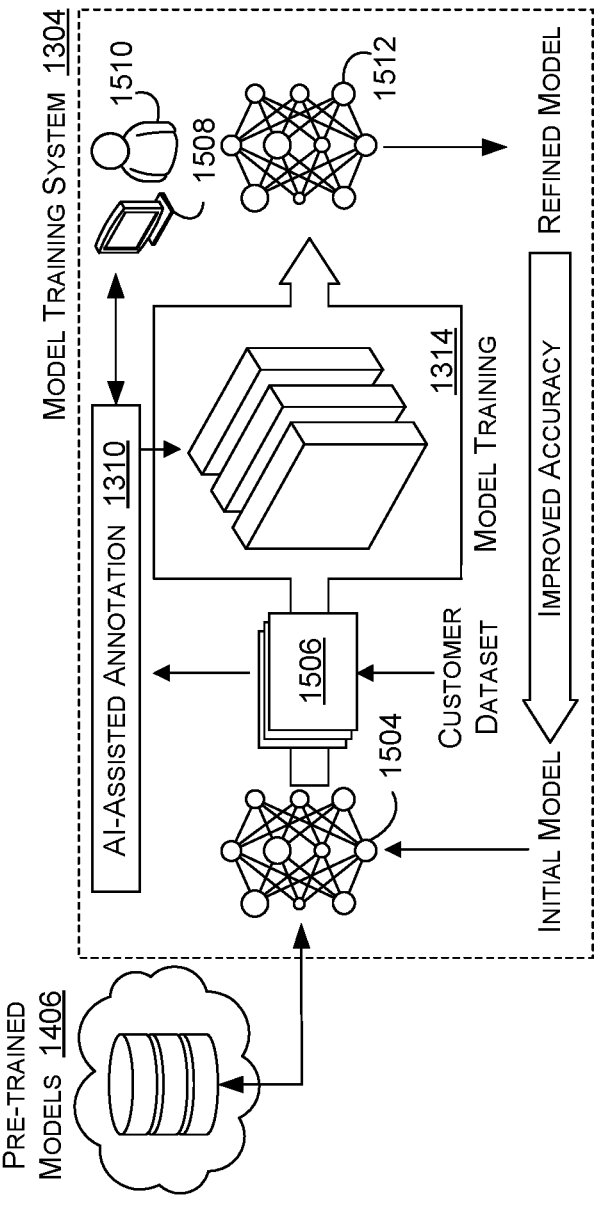
FIGS. 15A and 15B illustrate a data flow diagram for a process to train a machine learning model, as well as client-server architecture to enhance annotation tools with pre-trained annotation models, in accordance with at least one embodiment.

FIG. 15A illustrates a data flow diagram for a process 1500 to train, retrain, or update a machine learning model, in accordance with at least one embodiment. In at least one embodiment, process 1500 may be executed using, as a non-limiting example, system 1500 of FIG. 15. In at least one embodiment, process 1500 may leverage services and/or hardware as described herein. In at least one embodiment, refined models 1512 generated by process 1500 may be executed by a deployment system for one or more containerized applications in deployment pipelines.

In at least one embodiment, model training 1514 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1514 may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained models 1506 may be stored in a data store, or registry. In at least one embodiment, pre-trained models 1506 may have been trained, at least in part, at one or more facilities other than a facility executing process 1500. In at least one embodiment, to protect privacy and rights of patients, subjects, or clients of different facilities, pre-trained models 1506 may have been trained, on-premise, using customer or patient data generated on-premise. In at least one embodiment, pre-trained models 1306 may be trained using a cloud and/or other hardware, but confidential, privacy protected patient data may not be transferred to, used by, or accessible to any components of a cloud (or other off premise hardware). In at least one embodiment, where a pre-trained model 1506 is trained at using patient data from more than one facility, pre-trained model 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1506 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select a pre-trained model to use with an application. In at least one embodiment, pre-trained model may not be optimized for generating accurate results on customer dataset 1506 of a facility of a user (e.g., based on patient diversity, demographics, types of medical imaging devices used, etc.). In at least one embodiment, prior to deploying a pre-trained model into a deployment pipeline for use with an application(s), pre-trained model may be updated, retrained, and/or fine-tuned for use at a respective facility.

In at least one embodiment, a user may select pre-trained model that is to be updated, retrained, and/or fine-tuned, and this pre-trained model may be referred to as initial model 1504 for a training system within process 1500. In at least one embodiment, a customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility.

In at least one embodiment, AI-assisted annotation may be used in some examples to generate ground truth data. In at least one embodiment, AI-assisted annotation (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained models in a model registry to be selected by another facility. In at least one embodiment, his process may be completed at any number of facilities such that refined model 1512 may be further refined on new datasets any number of times to generate a more universal model.

Figure 15B:
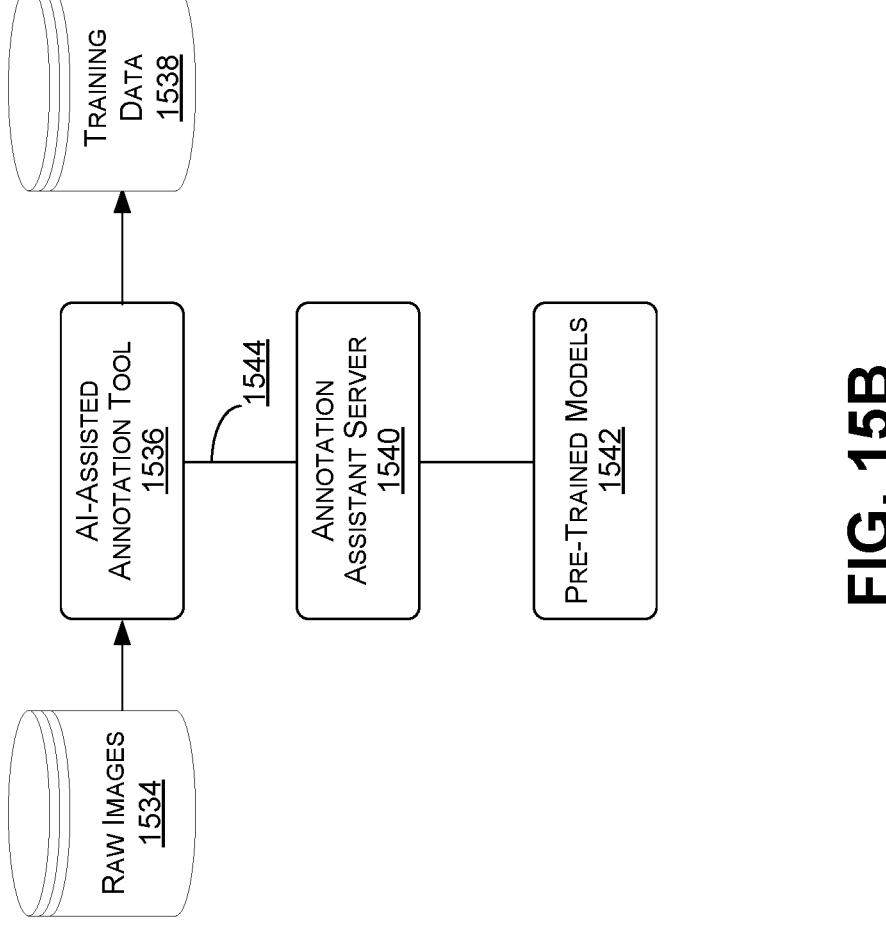

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines. In at least one embodiment, pre-installed annotation tools may be improved over time as new labeled data is added.

Various embodiments can be described by the following clauses:

1. A method, comprising:
   determining a first vector indicative of an emotional classification of input text;
   determining a second vector indicative of a character classification of the input text;
   generating, based at least on one or more text-to-speech (TTS) models processing the first vector and the second vector, an audio sample corresponding to the input text;

generating, based at least on one or more models processing the first vector, the second vector, and the audio sample, an output corresponding to a representation of a digital face; and causing, based at least on the output, the digital face to be rendered in an interaction environment.

2. The method of clause 1, further comprising:

receiving a set of seed words associated with emotional dimensions;

determining a set of synonym seed words for the emotional dimensions;

aligning the set of synonym seed words with a set of extension words in a language different from the set of seed words;

generating, based at least on the aligning, a set of extension seed words;

generating, based at least on the set of seed words, the set of synonym seed words, and the set of extension seed words, a seed word lexicon; and determining the first vector using a classifier trained, at least, on the seed word lexicon.

3. The method of clause 1, further comprising:

receiving a set of seed entries associated with character properties;

determining a set of synonym seed entries for the character properties;

generating, based at least on the set of seed entries and the set of synonym seed entries, a seed tuple lexicon; and determining the second vector using a classifier trained, at least, on the seed tuple lexicon.

4. The method of clause 3, wherein the seed entries comprise a tuple including two or more of a character topic, an emotion, or a personality type.

5. The method of clause 1, further comprising:

generating, based at least on one or more pose models processing the first vector and the second vector, an output corresponding to a mesh for a body of a digital avatar associated with the digital face, wherein the causing of the digital face to be rendered further includes causing, based at least on the mesh, the digital avatar to be rendered along with the digital face in the interaction environment.

6. The method of clause 1, further comprising:

receiving a conversational input from a user;

determining a range of emotional words within the conversational input exceeds a threshold; and generating a list of questions for presentation to the user.

7. The method of clause 6, further comprising:

presenting a question from the list of questions to the user;

receiving a response to the question;

determining a sentiment of the response; and determining the character classification for the user.

8. The method of clause 1, wherein the emotional classification corresponds to at least one of: a set of base emotions, respective strengths for the base emotions, or one or more combinations of the set of base emotions.

9. A processor comprising:

one or more circuits to:

determine one or more emotional features based at least on input text;

determine one or more character features based at least on the input text;

generate, based at least on the one or more emotional features and the one or more character features, synthesized audio corresponding to the input text; and generate, based at least on the emotional features, the character features, and the synthesized audio, a graphical representation of an avatar.

10. The processor of clause 9, wherein the one or more circuits are further to:

receive a set of seed words associated with the one or more emotional features;

determine a seed word lexicon for the set of seed words including at least seed word synonyms and a set of extension seed words.

11. The processor of clause 10, wherein the set of extension seed words is based, at least, on alignments between the set of seed words and a set of multi-language extension seed words.

12. The processor of clause 9, wherein the one or more emotional features are represented by a categorization of a base emotion and a strength of the base emotion.

13. The processor of clause 9, wherein the one or more circuits are further to:

receive a message from a user;

provide a personality testing message to the user responsive to the message;

receive a response to the personality testing message; and identify one or more characteristics associated with the one or more character features within the response.

14. The processor of clause 9, wherein the processor is comprised in at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a collaborative content creation platform for 3D assets; or a system implemented at least partially using cloud computing resources.

15. A system, comprising:

one or more processors to generate a virtual avatar representative of both an emotional state and a human character trait for an input text sequence, the virtual avatar rendered to depict recitation of an audio sample corresponding to the input text sequence.

16. The system of clause 15, wherein the emotional state is determined based at least on one or more portions of the input text sequence using a trained classifier associated with an emotional seed word lexicon.

17. The system of clause 16, wherein the emotional seed word lexicon includes at least one of a set of seed words, an extension set of seed words, or supplemental seed words.

18. The system of clause 15, wherein one or more facial features of the virtual avatar are adjusted responsive to at least one of the emotional state or the human character trait.

19. The system of clause 15, wherein the emotional state and the human character straight are quantified and provided as an input to a text-to-speech (TTS) system to convert the input text sequence to the audio sample.

20. The system of clause 15, wherein the system includes at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a collaborative content creation platform for 3D assets; or
a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:

determining a first vector indicative of an emotional classification of input text including at least an emotional category and an emotional strength for one or more portions of the input text:

determining a second vector indicative of a character classification of the input text including at least a character trait;

generating, based at least on one or more text-to-speech (TTS) models processing the first vector and the second vector, an audio sample corresponding to the input text;

generating, based at least on one or more models processing the first vector, the second vector, a speaker identity, encoded prior motion predictions, and the audio sample, an output corresponding to a representation of a digital face corresponding to movement of one or more feature points responsive to the input text; and causing, based at least on the output, the digital face to be rendered in an interaction environment.

2. The method of claim 1, further comprising:

receiving a set of seed words associated with emotional dimensions;

determining a set of synonym seed words for the emotional dimensions;

aligning the set of synonym seed words with a set of extension words in a language different from the set of seed words;

generating, based at least on the aligning, a set of extension seed words;

generating, based at least on the set of seed words, the set of synonym seed words, and the set of extension seed words, a seed word lexicon; and determining the first vector using a classifier trained, at least, on the seed word lexicon.

3. The method of claim 1, further comprising:

receiving a set of seed entries associated with character properties;

determining a set of synonym seed entries for the character properties;

generating, based at least on the set of seed entries and the set of synonym seed entries, a seed tuple lexicon; and determining the second vector using a classifier trained, at least, on the seed tuple lexicon.

4. The method of claim 3, wherein the seed entries comprise a tuple including two or more of a character topic, an emotion, or a personality type.

5. The method of claim 1, further comprising:

generating, based at least on one or more pose models processing the first vector and the second vector, an output corresponding to a mesh for a body of a digital avatar associated with the digital face, wherein the causing of the digital face to be rendered further includes causing, based at least on the mesh, the digital avatar to be rendered along with the digital face in the interaction environment.

6. The method of claim 1, further comprising:

receiving a conversational input from a user;

determining a range of emotional words within the conversational input exceeds a threshold; and generating a list of questions for presentation to the user.

7. The method of claim 6, further comprising:

presenting a question from the list of questions to the user;

receiving a response to the question;

determining a sentiment of the response; and determining the character classification for the user.

8. The method of claim 1, wherein the emotional classification corresponds to at least one of: a set of base emotions, respective strengths for the base emotions, or one or more combinations of the set of base emotions.

9. A processor comprising:

one or more circuits to:

determine one or more emotional features based at least on input text, the one or more emotional features corresponding to a set of vectors including at least a first vector corresponding to base emotional classifications, a second vector corresponding to strength classifications for the base emotional classifications, and a third vector corresponding to one or more additional emotion categories;

determine one or more character features based at least on the input text;

generate, based at least on the one or more emotional features and the one or more character features, synthesized audio corresponding to the input text including one or more labels for portions of the synthesized audio for the one or more emotional features and the one or more character features; and generate, based at least on the emotional features, the character features, and the synthesized audio, a graphical representation of an avatar including movement of one or more facial features of the avatar responsive to time positions of the one or more labels.

10. The processor of claim 9, wherein the one or more circuits are further to:

receive a set of seed words associated with the one or more emotional features; and determine a seed word lexicon for the set of seed words including at least seed word synonyms and a set of extension seed words.

11. The processor of claim 10, wherein the set of extension seed words is based, at least, on alignments between the set of seed words and a set of multi-language extension seed words.

12. The processor of claim 9, wherein the one or more circuits are further to:

receive a message from a user;

provide a personality testing message to the user responsive to the message;

receive a response to the personality testing message; and identify one or more characteristics associated with the one or more character features within the response.

13. The processor of claim 9, wherein the processor is comprised in at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a collaborative content creation platform for 3D assets; or a system implemented at least partially using cloud computing resources.

14. A system, comprising:

one or more processors to generate a virtual avatar representative of both an emotional state and a human character trait for an input text sequence, the virtual avatar rendered to depict recitation of an audio sample corresponding to the input text sequence, the emotional state based on determined emotion vectors corresponding to one or more base emotions and relative strengths for the input text sequence, and a determined character vector.

15. The system of claim 14, wherein the emotional state is determined based at least on one or more portions of the input text sequence using a trained classifier associated with an emotional seed word lexicon.

16. The system of claim 15, wherein the emotional seed word lexicon includes at least one of a set of seed words, an extension set of seed words, or supplemental seed words.

17. The system of claim 14, wherein one or more facial features of the virtual avatar are adjusted responsive to at least one of the emotional state or the human character trait.

18. The system of claim 14, wherein the emotional state and the human character trait are quantified and provided as an input to a text-to-speech (TTS) system to convert the input text sequence to the audio sample.

19. The system of claim 14, wherein the system includes at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a collaborative content creation platform for 3D assets; or a system implemented at least partially using cloud computing resources.

* * * * *